United States Patent
Christian et al.

(10) Patent No.: US 9,785,467 B1
(45) Date of Patent: Oct. 10, 2017

(54) THREADSAFE USE OF NON-THREADSAFE LIBRARIES WITH MULTI-THREADED PROCESSES

(71) Applicant: SAS Institute Inc., Cary, NC (US)

(72) Inventors: Stacey Michelle Christian, Pittsboro, NC (US); Steven Daniel Miles, Durham, NC (US); Steven E. Krueger, Raleigh, NC (US)

(73) Assignee: SAS Institute Inc., Cary, NC (US)

(*) Notice: Subject to any disclaimer, the term of this patent is extended or adjusted under 35 U.S.C. 154(b) by 0 days.

(21) Appl. No.: 15/465,287

(22) Filed: Mar. 21, 2017

Related U.S. Application Data

(60) Provisional application No. 62/311,474, filed on Mar. 22, 2016, provisional application No. 62/328,195, filed on Apr. 27, 2016.

(51) Int. Cl.
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | | |
|---|---|---|---|---|
| 6,895,584 B1 * | 5/2005 | Belkin | ................. | G06F 9/5027 718/100 |
| 8,230,426 B2 * | 7/2012 | Powers | ................. | G06F 9/505 712/28 |
| 2003/0115178 A1 * | 6/2003 | Doole | ................. | G06F 9/4843 |
| 2013/0042080 A1 * | 2/2013 | Waddington | ............ | G06F 9/526 711/152 |
| 2014/0157286 A1 * | 6/2014 | Brazier | ................. | G06F 9/4881 718/106 |

OTHER PUBLICATIONS

"21 SWIG and Java", retrieved from <http://www.swig.org/Doc1.3/Jva.html>, (2009), pp. 1-35, (author unknown).

"21 SWIG and Java", retrieved from <http://www.swig.org/Doc1.3/Jva.html>, (2009), pp. 36-70, (author unknown).

(Continued)

*Primary Examiner* — Umut Onat

(57) ABSTRACT

An apparatus includes a processor and a storage storing instructions causing the processor to determine whether an analysis routine is multi-threaded and calls a library function of a non-threadsafe library, and if so, causes the processor to: instantiate an analysis process for executing the analysis routine on multiple threads; instantiate an instance of the library for execution within a isolated library process; instantiate another instance of the library for execution within another isolated library process; retrieve library metadata providing a function prototype of the library function; employ the function prototype to generate an instance of a bridge routine to enable a call from the analysis routine on a first thread to the library function; employ the function prototype to generate another instance of the bridge routine to enable a call from the analysis routine on a second thread to the library function; and begin execution of the analysis routine.

30 Claims, 28 Drawing Sheets

(56) References Cited

OTHER PUBLICATIONS

"21 SWIG and Java", retrieved from <http://www.swig.org/Doc1.3/Jva.html>, (2009), pp. 71-95, (author unknown).
"SWIG Tutorial", retrieved from <http://www.swig.org/tutorial.html>, (2003), 4 pages, (author unknown).
Varadarajan, Premkumar, "What is COM?", retrieved from <hrrp://www.kamath.com/columns/comsutra/cs001_whatiscom.asp>, (2000), 2 pages.
"System Requirements—SAS High Performance Risk 3.5", retrieved from <http://support.sas.com/documentation/installcenter/en/ikhpriskofrsr/68969/HTML/default/index.html>, (2015), 4 pages, (author unknown).

\* cited by examiner

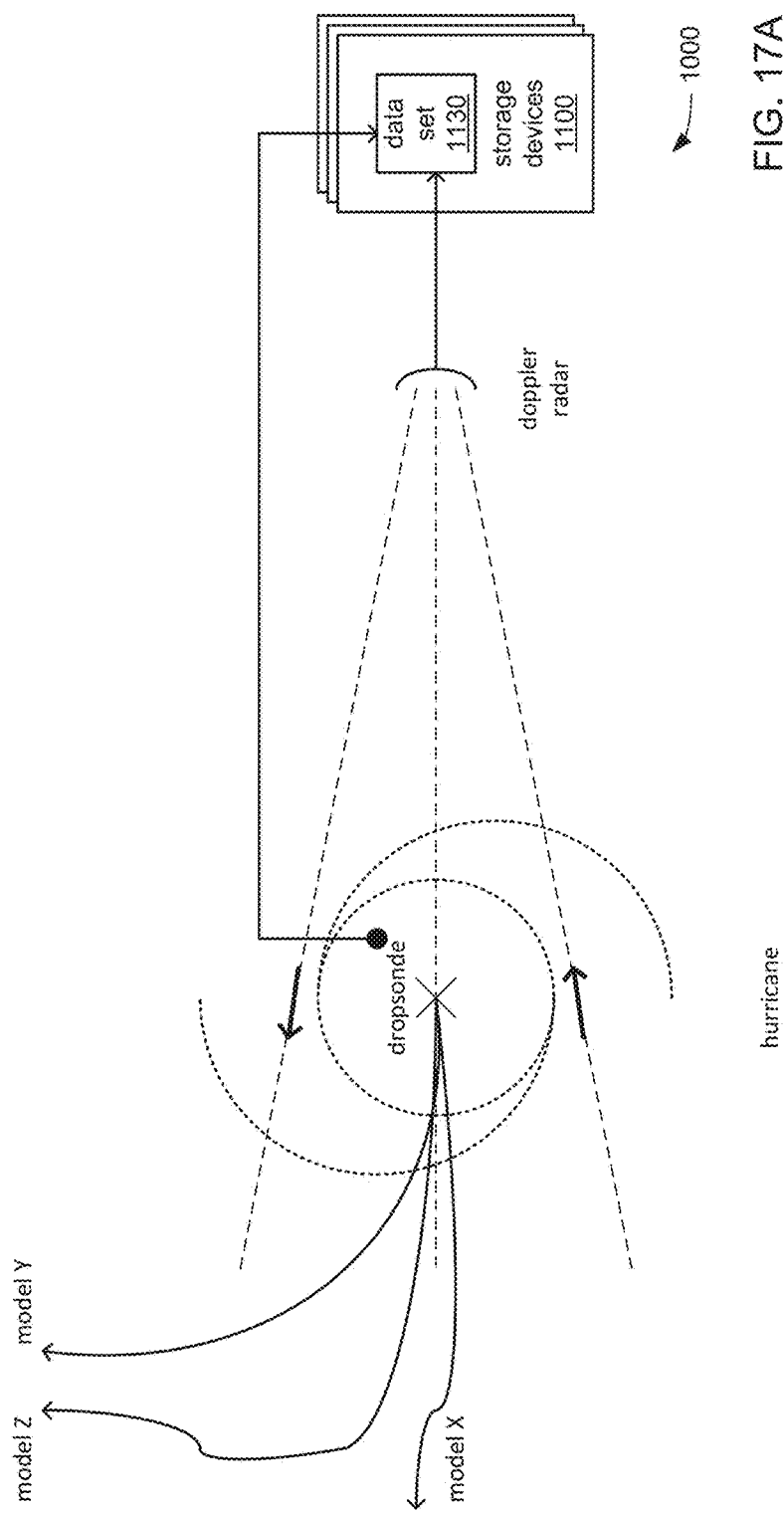

THREADSAFE USE OF NON-THREADSAFE LIBRARIES WITH MULTI-THREADED PROCESSES

CROSS-REFERENCE TO RELATED APPLICATIONS

This application claims the benefit of priority under 35 U.S.C. §119(e) to U.S. Provisional Application Ser. No. 62/311,474 filed Mar. 22, 2016, and U.S. Provisional Application Ser. No. 62/328,195 filed Apr. 27, 2016, the entirety of each of which is incorporated herein by reference.

BACKGROUND

It has become increasingly commonplace to use grids of multiple node devices to perform widely varied analyses of large data sets (e.g., what is commonly referred to as "big data") of widely varied types. Such grids of node devices are often used to speed the performance of an analysis of a large data set by independently processing multiple partitions of the data set in parallel through the parallel execution of identical analysis routines. Over time, just as such data sets have increased in size, the quantity and range of capabilities of the node devices in grids of node devices have also increased. By way of example, it has become commonplace for the node devices of a grid to each be capable of multi-threaded execution of analysis routines.

To take advantage of such increased processing capabilities, it has become desirable to sweep together numerous older and simpler analyses to become components of newer and more complex analyses. Unfortunately, the manner in which many of such older analyses were implemented in software adhered to older programming practices that often render such software incapable of being executable as multiple instances across multiple threads, so as to not be "thread-safe" in the multi-threaded execution environments that have no become commonplace among node devices.

Such limitations of such software could be accommodated through the imposition of restrictions on the manner in which such software is executed within each node device of a grid. However, such restrictions would result in the wastage of considerable processing resources as it may be that only single-threaded execution is possible within each node device during each occasion on which such software is executed. Alternatively, such software could be rewritten to adhere to newer programming practices that would result in such rewritten software being threadsafe. However, budgetary constraints, legal requirements to recertify software that has been rewritten, and/or other factors may make such rewriting prohibitively difficult and/or expensive.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to parse declaration code of an analysis routine to determine whether the analysis routine is multi-threaded and is to make at least one function call to at least one non-threadsafe library routine, and in response to a determination that the analysis routine is multithreaded and is to make at least one function call to at least one non-threadsafe library routine, cause the processor to perform operations including: instantiate a single analysis process to support execution of the analysis routine on multiple threads; instantiate a first instance of a first non-threadsafe library routine of the at least one non-threadsafe library routine for execution by the processor within a first library process, wherein the first library process is isolated from the analysis process; instantiate a second instance of the first non-threadsafe library routine for execution by the processor within a second library process, wherein the second library process is isolated from the analysis process and the first library process; retrieve first library metadata providing at least one function prototype of at least one library function of the first non-threadsafe library routine; employ the at least one function prototype of the first library metadata to generate a first instance of a first bridge routine to enable a function call from the execution of the analysis routine on a first thread of the multiple threads to the at least one library function of the first instance of the first non-threadsafe library routine; employ the at least one function prototype of the first library metadata to generate a second instance of the first bridge routine to enable a function call from the execution of the analysis routine on a second thread of the multiple threads to the at least one library function of the second instance of the first non-threadsafe library routine; and begin execution of the analysis routine on the multiple threads within the analysis process.

The processor may be caused to generate the first and second instances of the first bridge routine to enable a return of a value, to the analysis routine, that results from execution of the at least one library function. The processor may be caused to perform operations including: monitor execution of the analysis routine to determine whether execution of the analysis routine has ceased; and in response to a determination that execution of the analysis routine has ceased, uninstantiate the analysis process, and uninstantiate the first and second instances of the first non-threadsafe library routine.

The processor may be caused to perform operations including: instantiate an instance of a second non-threadsafe library routine of the at least one non-threadsafe library routine to execute iwithin a third library process, wherein the third library process is isolated from the analysis process and is isolated from the first and second library processes; retrieve second library metadata that provides at least one function prototype of at least one library function of the second non-threadsafe library routine; and employ the at least one function prototype of the second library metadata to generate an instance of a second bridge routine to enable a function call from the execution of the analysis routine on the first thread to the at least one library function of the instance of the second non-threadsafe library routine. The processor may also be caused to perform operations including: retrieve bridge routine code; employ the at least one function prototype of the first library metadata to generate the first and second instances of the first bridge routine from the bridge routine code; and employ the at least one function prototype of the second library metadata to generate the instance of the second bridge routine from the bridge routine code. The first non-threadsafe library routine may include a first version of a callable library function; the second non-threadsafe library routines may include a second version of the callable library function; the first version and the second version of the callable library function may each callable with an identical single function call; and the analysis routine may include a first function call that specifies the first version of the callable library function and a second function call that specifies the second version of the callable library function. The processor may be caused to perform operations including: generate the first instance of the first bridge routine to convert the first function call into the single function call directed to the first version of the callable library function within the first non-threadsafe library routine; and generate the instance of the second bridge routine to convert the second function call into the single function call directed to the second version of the callable library function within the second non-threadsafe library routine.

The processor may be caused to instantiate the analysis process, instantiate the first and second instances of the first non-threadsafe library routine, and generate the first and second instances of the first bridge routine dynamically at runtime of the analysis routine. The processor may be caused to perform operations including: monitor execution of the analysis routine at runtime to determine whether there is an occurrence of a function call from execution of the analysis routine on the first thread to the at least one library function of the first non-threadsafe library routine; and in response to a determination that there is an occurrence of a function call to the at least one library function of the first non-threadsafe library routine, instantiate the first and second instances of the first non-threadsafe library routine, and generate the first and second instances of the first bridge routine.

The processor may begin execution of the analysis routine on the multiple threads within the analysis process after instantiation of the analysis process, after instantiation of the first and second instances of the first non-threadsafe library routine, and after generation of the first and second instances of the first bridge routine. The processor may be caused to perform operations including: parse the analysis routine to determine whether there is at least one occurrence of a function call to the at least one library function of the first non-threadsafe library routine; and in response to a determination that there is at least one function call to at least one library function of the first non-threadsafe library routine, instantiate the first and second instances of the first non-threadsafe library routine, and generate the first and second instances of the first bridge routine.

A computer-program product tangibly embodied in a non-transitory machine-readable storage medium, the computer-program product including instructions operable to cause a processor to perform operations including parse declaration code of an analysis routine to determine whether the analysis routine is multi-threaded and is to make at least one function call to at least one non-threadsafe library routine, and in response to a determination that the analysis routine is multithreaded and is to make at least one function call to at least one non-threadsafe library routine, cause the processor to perform operations comprising: instantiate a single analysis process to support execution of the analysis routine on multiple threads; instantiate a first instance of a first non-threadsafe library routine of the at least one non-threadsafe library routine for execution by the processor within a first library process, wherein the first library process is isolated from the analysis process; instantiate a second instance of the first non-threadsafe library routine for execution by the processor within a second library process, wherein the second library process is isolated from the analysis process and the first library process; retrieve first library metadata providing at least one function prototype of at least one library function of the first non-threadsafe library routine; employ the at least one function prototype of the first library metadata to generate a first instance of a first bridge routine to enable a function call from the execution of the analysis routine on a first thread of the multiple threads to the at least one library function of the first instance of the first non-threadsafe library routine; employ the at least one function prototype of the first library metadata to generate a second instance of the first bridge routine to enable a function call from the execution of the analysis routine on a second thread of the multiple threads to the at least one library function of the second instance of the first non-threadsafe library routine, and begin execution of the analysis routine on the multiple threads within the analysis process.

The processor may be caused to generate the first and second instances of the first bridge routine to enable a return of a value, to the analysis routine, that results from execution of the at least one library function. The processor may be caused to perform operations including: monitor execution of the analysis routine to determine whether execution of the analysis routine has ceased; and in response to a determination that execution of the analysis routine has ceased, uninstantiate the analysis process, and uninstantiate the first and second instances of the first non-threadsafe library routine.

The processor may be caused to perform operations including: instantiate an instance of a second non-threadsafe library routine of the at least one non-threadsafe library routine to execute within a third library process, wherein the third library process is isolated from the analysis process and is isolated from the first and second library processes; retrieve second library metadata that provides at least one function prototype of at least one library function of the second non-threadsafe library routine; and employ the at least one function prototype of the second library metadata to generate an instance of a second bridge routine to enable a function call from the execution of the analysis routine on the first thread to the at least one library function of the instance of the second non-threadsafe library routine. The processor may be caused to perform operations including: retrieve bridge routine code; employ the at least one function prototype of the first library metadata to generate the first and second instances of the first bridge routine from the bridge routine code; and employ the at least one function prototype of the second library metadata to generate the instance of the second bridge routine from the bridge routine code. The first non-threadsafe library routine may include a first version of a callable library function; the second non-threadsafe library routines may include a second version of the callable library function; the first version and the second version of the callable library function may each callable with an identical single function call; and the analysis routine may include a first function call that specifies the first version of the callable library function and a second function call that specifies the second version of the callable library function. The processor may be caused to perform operations including: generate the first instance of the first bridge routine to convert the first function call into the single function call directed to the first version of the callable library function within the first non-threadsafe library routine; and generate the instance of the second bridge routine to convert the second function call into the single function call directed to the second version of the callable library function within the second non-threadsafe library routine.

The processor may be caused to instantiate the analysis process, instantiate the first and second instances of the first non-threadsafe library routine, and generate the first and second instances of the first bridge routine dynamically at runtime of the analysis routine. The processor may be caused to perform operations including: monitor execution of the analysis routine at runtime to determine whether there is an occurrence of a function call from execution of the analysis routine on the first thread to the at least one library function of the first non-threadsafe library routine; and in response to a determination that there is an occurrence of a function call to the at least one library function of the first non-threadsafe library routine, instantiate the first and second instances of the first non-threadsafe library routine, and generate the first and second instances of the first bridge routine.

The processor may begin execution of the analysis routine on the multiple threads within the analysis process after instantiation of the analysis process, after instantiation of the first and second instances of the first non-threadsafe library routine, and after generation of the first and second instances of the first bridge routine. The processor may be caused to perform operations including: parse the analysis routine to determine whether there is at least one occurrence of a function call to the at least one library function of the first non-threadsafe library routine; and in response to a determination that there is at least one function call to at least one library function of the first non-threadsafe library routine, instantiate the first and second instances of the first non-threadsafe library routine, and generate the first and second instances of the first bridge routine.

A computer-implemented method may include parsing, by a processor, declaration code of an analysis routine to determine whether the analysis routine is multi-threaded and is to make at least one function call to at least one non-threadsafe library routine, and in response to a determination by the processor that the analysis routine is multithreaded and is to make at least one function call to at least one non-threadsafe library routine, performing operations including: instantiating a single analysis process to support execution of the analysis routine on multiple threads; instantiating a first instance of a first non-threadsafe library routine of the at least one non-threadsafe library routine for execution within a first library process, wherein the first library process is isolated from the analysis process; instantiating a second instance of the first non-threadsafe library routine for execution within a second library process, wherein the second library process is isolated from the analysis process and the first library process; retrieving, by the processor, first library metadata providing at least one function prototype of at least one library function of the first non-threadsafe library routine; employing the at least one function prototype of the first library metadata to generate, by the processor, a first instance of a first bridge routine to enable a function call from the execution of the analysis routine on a first thread of the multiple threads to the at least one library function of the first instance of the first non-threadsafe library routine; employing the at least one function prototype of the first library metadata to generate, by the processor, a second instance of the first bridge routine to enable a function call from the execution of the analysis routine on a second thread of the multiple threads to the at least one library function of the second instance of the first non-threadsafe library routine; and beginning execution of the analysis routine on the multiple threads within the analysis process.

The method may include generating the first and second instances of the first bridge routine to enable a return of a value, to the analysis routine, that results from executing the at least one library function. The method may include: monitoring, by the processor, execution of the analysis routine to determine whether execution of the analysis routine has ceased; and in response to a determination that execution of the analysis routine has ceased, uninstantiating, by the processor, the analysis process, and uninstantiating, by the processor, the first and second instances of the first non-threadsafe library routine.

The method may include: instantiating an instance of a second non-threadsafe library routine of the at least one non-threadsafe library routine for execution within a third library process, wherein the third library process is isolated from the analysis process and is isolated from the first and second library processes; retrieving, by the processor, second library metadata providing at least one function prototype of at least one library function of the second non-threadsafe library routine; and employing the at least one function prototype of the second library metadata to generate, by the processor, an instance of a second bridge routine to enable a function call from the execution of the analysis routine on the first thread to the at least one library function of the instance of the second non-threadsafe library routine. The method may include: retrieving bridge routine code; employing the at least one function prototype of the first library metadata to generate, by the processor, the first and second instances of the first bridge routine from the bridge routine code; and employing the at least one function prototype of the second library metadata to generate, by the processor, the instance of the second bridge routine from the bridge routine code. The first non-threadsafe library routine may include a first version of a callable library function; the second non-threadsafe library routines comprises a second version of the callable library function; the first version and the second version of the callable library function may each callable with an identical single function call; and the analysis routine may include a first function call that specifies the first version of the callable library function and a second function call that specifies the second version of the callable library function. The method may include: generating, by the processor, the first instance of the first bridge routine to convert the first function call into the single function call directed to the first version of the callable library function within the first non-threadsafe library routine; and generating, by the processor, the instance of the second bridge routine to convert the second function call into the single function call directed to the second version of the callable library function within the second non-threadsafe library routine.

The method may include instantiating the analysis process, instantiating the first and second instances of the first non-threadsafe library routine, and generating the first and second instances of the first bridge routine dynamically at runtime of the analysis routine. The method may include monitoring, by the processor, execution of the analysis routine at runtime to determine whether there is an occurrence of a function call from execution of the analysis routine on the first thread to the at least one library function of the first non-threadsafe library routine; and in response to a determination that there is an occurrence of a function call to the at least one library function of the first non-threadsafe library routine, instantiating the first and second instances of the first non-threadsafe library routine, and generating the first and second instances of the first bridge routine.

The method may include beginning execution of the analysis routine on the multiple threads within the analysis process after instantiation of the analysis process, after instantiation of the first and second instances of the first non-threadsafe library routine, and after generation of the first and second instances of the first bridge routine. The method may include: parsing, by the processor, the analysis routine to determine whether there is at least one occurrence of a function call to the at least one library function of the first non-threadsafe library routine; and in response to a determination that there is at least one function call to at least one library function of the first non-threadsafe library routine, instantiating the first and second instances of the first non-threadsafe library routine, and generating the first and second instances of the first bridge routine.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 17A, 17B and 17C, together, illustrate an example of preparation of multiple non-threadsafe libraries associated with weather prediction.

DETAILED DESCRIPTION

Figure 1:
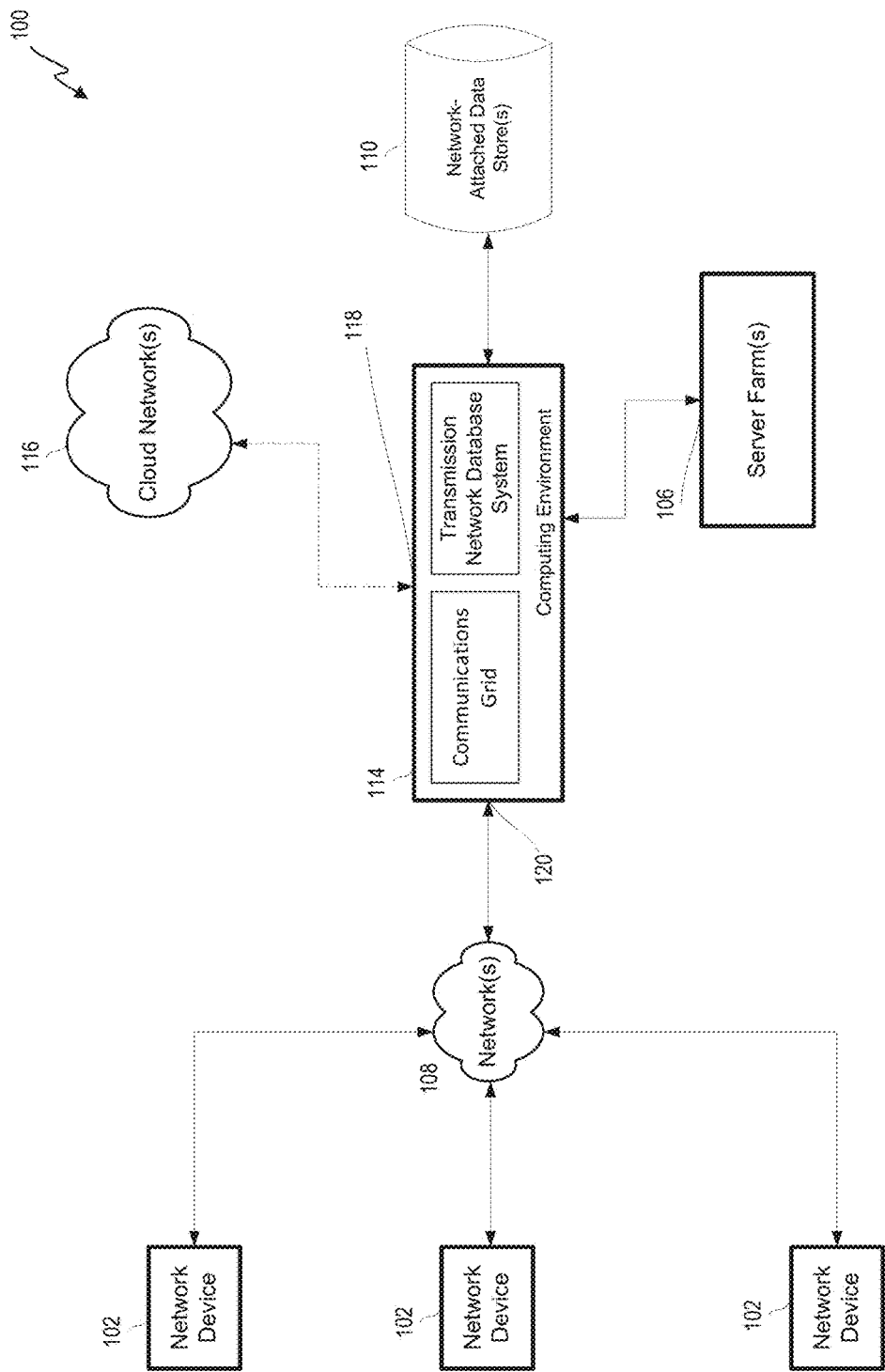
FIG. 1 illustrates a block diagram that provides an illustration of the hardware components of a computing system, according to some embodiments of the present technology.

Various embodiments described herein are generally directed to techniques for enabling the use of a non-threadsafe library routine that includes library functions that may be called from more than one thread of a multi-threaded analysis routine executed within each of multiple node devices in a node device grid. More precisely, each one of multiple node devices of a node device grid may, separately and at least partially in parallel, execute a multi-threaded analysis routine with one of multiple data set partitions of a data set that have been distributed among the multiple node devices. Within each of the multiple node devices, a processor may support the multi-threaded execution of such an analysis routine within a single multi-threaded analysis process. As a result, different portions of the analysis routine executed on different threads may make calls to library function(s) of the same non-threadsafe library routine in a manner that includes no coordination among those threads. To address this, for each thread of the analysis process that is to make at least one call to at least one library function of the library routine, a separate instance of the library routine may be generated and executed within a corresponding separate library process. Also, for each such thread, a corresponding separate instance of a bridge routine may be generated and used to link each of such threads of the analysis routine to its corresponding separate instance of the library routine within its corresponding separate library process. In this way, the library functions of the non-threadsafe library routine are able to be executed in a threadsafe manner when called from within different portions of the analysis routine that are executed on different threads.

The situation in which a multi-threaded analysis routine must rely upon one or more non-threadsafe library routines may arise in any of a number of scientific, industrial and/or other fields. It may be that such a non-threadsafe library routine was originally provided by a source that no longer exists and/or is otherwise unavailable such that the non-threadsafe library routine cannot be rewritten by the source to be made threadsafe. By way of example, a non-threadsafe library routine may have been provided by a vendor that never made the source code of the library routine available, and that has since ceased to offer such library routines and/or since ceased to be in operation (e.g., entered bankruptcy, etc.). Alternatively, it may be that such a non-threadsafe library routine is used by an educational entity (e.g., a college or university) with a relatively limited budget such that money is not available to defray the costs of rewriting the library routine to become threadsafe. As another alternative, it may be that the non-threadsafe library routine is the subject of a patent, a licensing agreement or other form of intellectual property protection that precludes rewriting the library routine to become threadsafe. As still another alternative, the non-threadsafe library routine may have been required to be certified or otherwise approved for use by a governmental agency or other authority in what may be a burdensome and/or expensive process, and therefore, the making of revisions to the library routine to make threadsafe may not be possible without resubmitting it for re-certification or other form of re-approval. Thus, while there may be no technological barrier to rewriting a non-threadsafe library routine to become threadsafe, other circumstances may preclude it, or at least make doing so prohibitively difficult.

As will be familiar to those skilled in the art, a typical issue with the use of a non-threadsafe library routine in a multi-threaded processing environment is the occurrence of collisions in the use of variables that become shared when multiple instances of a non-threadsafe library routine are concurrently executed on multiple threads. More specifically, unlike routines that are written to be threadsafe such that each instance that is executed on a different thread is able to maintain its variables as entirely separate from those of all of the other instances, the manner in which variables are often instantiated in a non-threadsafe routine causes those variable to become shared among such multiple instances executed on multiple threads. The multiple instances of the non-threadsafe routine are thereby caused to access the shared variables in an entirely uncoordinated manner, including writing conflicting values to the shared variables. Where such shared variables include data used as inputs to analyses performed by the multiple instances of the non-threadsafe routine, the results may) be at least errant outputs from those analyses. Where such shared variables include indices and/or decision variables that control execution flow and/or the iterations of loops, the results may be errant and unpredictable execution behavior, including the development of endless loops from race conditions associated with the uncoordinated writing of values to such shared variables.

One approach to preventing such outcomes from the use of a non-threadsafe library routine by multiple threads of an analysis routine may be to allow only one of multiple instances of the non-threadsafe library routine to be executed at a time. Unfortunately, this approach may effectively convert the multi-threaded analysis routine into a single-threaded analysis routine whenever a situation arises in which more than one portion of the analysis routine executing on different threads makes a call to a library function of the non-threadsafe library routine at about the same time. The handling of those calls would be serialized, with only one of those calls made from only one of those threads of the analysis routine being allowed to trigger execution of a called library function at a time, while such execution of a called library function for on one or more others of the threads would be delayed, thereby effectively stalling further execution of those one or more others of the threads.

By using a combination of multiple separate library processes and corresponding instances of bridge routines to enable parallel execution of multiple instances of a non-threadsafe library routine, such serialization among threads of a multi-threaded analysis routine may be entirely avoided. This may advantageously allow the multi-threaded execution support provided by the processors of the node devices of node device grid to be more fully utilized, which in turn, may enable a corresponding fuller utilization of storage resources within each of the node devices. Thus, instead of allowing multiple processor cores of a processor to be forced to remain idle, more of those processors cores may be more fully utilized throughout more of the time during which the analysis routine is executed. As a result of being able to more fully utilize such features of the node devices, the time required for the execution of a multi-threaded analysis routine may be greatly reduced, thereby advantageously allowing the node device grid to be utilized to perform more analyses in less time.

Such advantageously more efficient use of multi-threading support may become considerably more acute in node devices that incorporate one or more graphics processing units (GPUs) in addition to or in lieu of one or more central processing units (CPUs). As will be familiar to those skilled in the art, there is an increasingly commonplace trend toward equipping node devices of a grid of node devices with one or more GPUs to take advantage of the considerably higher degree of parallelism supported by their internal architectures, including what may be support for dozens, hundreds, thousands, or still more threads of execution. Over time, the characteristics of the operations that need to be performed to more quickly render graphical images have encouraged the development of GPUs that have relatively limited instruction sets, but which are able to perform those limited instructions in parallel across a relatively large number of threads. It has been found that, where at least a portion of an analysis of numerous partitions of a large data set is amenable to being performed using GPU(s), a considerable increase in speed of performance of such analyses may be realized by doing so. Thus, enabling the use of multiple instances of a non-threadsafe routine to at least enable the use of such multi-threading support of a GPU may enable an analysis that would require days to perform through the use of CPUs to, instead, be performed in mere minutes through use of GPUs.

In some embodiments, a coordinating device of a node device grid may directly distribute, or otherwise cause the distribution of, copies of a non-threadsafe library routine among multiple node devices of a node device grid to be executed within each of the multiple node devices. This may accompany the distribution of copies of a multi-threaded analysis routine among the multiple node devices. Such distribution may be performed and/or may be coordinated by the coordinating device as preparation for the multiple node devices to each, separately and at least partially in parallel, execute their corresponding copies of the multi-threaded analysis routine and non-threadsafe library routine. Upon receipt of at least the copies of the analysis routine, within each of the multiple node devices, the source code of the analysis routine may be parsed to determine whether there exists a situation in which multiple threads of the analysis routine may make calls, during execution, to library functions of the non-threadsafe library routine.

The exact manner in which such a determination is made may depend on the programming language in which the analysis routine is written, and/or the particular compiler selected for use to compile the analysis routine. In some embodiments, declarations within the source code of the analysis routine (which may be positioned at the start of the source code) and/or of another supporting portion of source code (e.g., within a header file associated with the source code of the analysis routine) may be parsed for an indication that the analysis routine is multi-threaded such that there are multiple portions of the analysis routine are at least able to be executed concurrently on separate ones of multiple threads. Such an indication may be a compiler directive directly indicating the use of multiple threads, a reference to a header file that contains an indication of the use of multiple threads, a comment line that include a particular word and/or characters that serve as an indication of the use of multiple threads, etc. By way of example, where the analysis routine is written to make use of multi-threaded capabilities of GPUs incorporated into each of the multiple node devices, the declarations within the source code of the analysis routine and/or within a header file may make one or more references to still other source code associated with the use of such capabilities of a GPU.

Upon determining that the analysis routine is a multi-threaded routine, the analysis process may be instantiated as a multi-threaded process. Within each node device, a processor thereof may be caused to allocate multiple threads to support such multi-threaded execution of the analysis routine within the analysis process. In some embodiments, the quantity of threads that are instantiated within the analysis process may also be specified in the declarations of the source code of the analysis routine.

Also upon determining that the analysis routine is a multi-threaded routine, declarations within the source code of the analysis routine and/or of one or more supporting portions of source code (e.g., header files) may be parsed for an indication that one or more calls may be made by one or more portions of the analysis routine that may be executed concurrently on separate ones of multiple threads. In some embodiments, descriptive information about the library functions of the non-threadsafe library routine that are to be called from the analysis routine may be included in library metadata that may be referred to within the declarations. The library metadata may include one or more library function prototypes that define aspects of the manner in which the corresponding library functions may be called, including defining aspects of input and/or output parameters. Such library metadata may be implemented as a header file or other similar data structure that may then be referred to by its file name or other identifier from within the declarations of the source code of the analysis routine and/or of other supporting portion of source code (e.g., a header file). Thus, the library metadata, regardless of its exact form, may provide the information needed to thereby "register" those library functions with the compiler and/or other routine that compiles and/or otherwise prepares the analysis routine for execution.

Upon determining that the analysis routine is to make one or more calls to a non-threadsafe library routine, a quantity of single-threaded library processes may be instantiated that may be based on the quantity of threads on which portions of the analysis routine are to be executed that will make such calls. Thus, a separate single-threaded library process may be generated to correspond to each such portion of the analysis routine, and a separate instance of the non-threadsafe library routine may be generated for execution within each of those single-threaded library processes. Further, to provide an interface between each such portion of the analysis routine and its corresponding instance of the non-threadsafe library routine within a corresponding single-threaded library process, the information within the library metadata concerning the called library functions may be used to generate a corresponding instance of a bridge routine associated with non-threadsafe library routine.

Each instance of the bridge routine may include source code that enables a call to a library function within the non-threadsafe library routine to become a call to the bridge routine, instead. Stated differently, the source code within the bridge routine may define a function with the same identifier and parameter definitions as one of the library functions such that it is able to be called by the analysis routine in place of the library function as if it were the library function. However, the bridge routine includes other source code that relays the call made within the analysis process to the library function within a corresponding one of the instances of the non-threadsafe library routine executed within a corresponding one of the single-threaded library processes. Upon completion of the execution of the library function within that single-threaded library process, the results are relayed back to the analysis routine through the bridge routine in a manner that resembles the provision of those results directly to the analysis routine from the called library function. Stated differently, instances of the bridge routine are used to make the library functions within corresponding instances of the non-threadsafe library callable by the analysis routine from within the multi-threaded analysis process.

In embodiments in which there are multiple non-threadsafe library routines that will be called from within multiple portions of the analysis routine executed on multiple threads, each additional such non-threadsafe library routine may be handled in the same manner. More specifically, for each additional non-threadsafe library routine, a quantity of additional single-threaded library processes may be instantiated that may be based on the quantity of threads on which portions of the analysis routine are to be executed that will make calls to the additional non-threadsafe library routine. Also, a separate instance of the additional non-threadsafe library routine may be generated for execution within each of those additional single-threaded library processes. Further, the information within library metadata concerning the called library functions of the additional non-threadsafe library routine may be used to generate an instance of an additional bridge routine for each instance of the additional non-threadsafe library routine that is instantiated within a corresponding additional single-threaded library process.

It should be noted that the generation of multiple instances of a non-threadsafe library routine, the multiple corresponding separate library processes and/or the multiple corresponding instances of a bridge routine may occur prior to execution of the multi-threaded analysis routine, or dynamically at the time of execution of the analysis routine as calls to library functions of the library routine are made. Upon completion of the execution of the analysis routine, all instances of non-threadsafe library routines, all single-threaded library processes and/or all instances of bridge routines may be un-instantiated, along with the un-instantiation of the multi-threaded analysis process.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
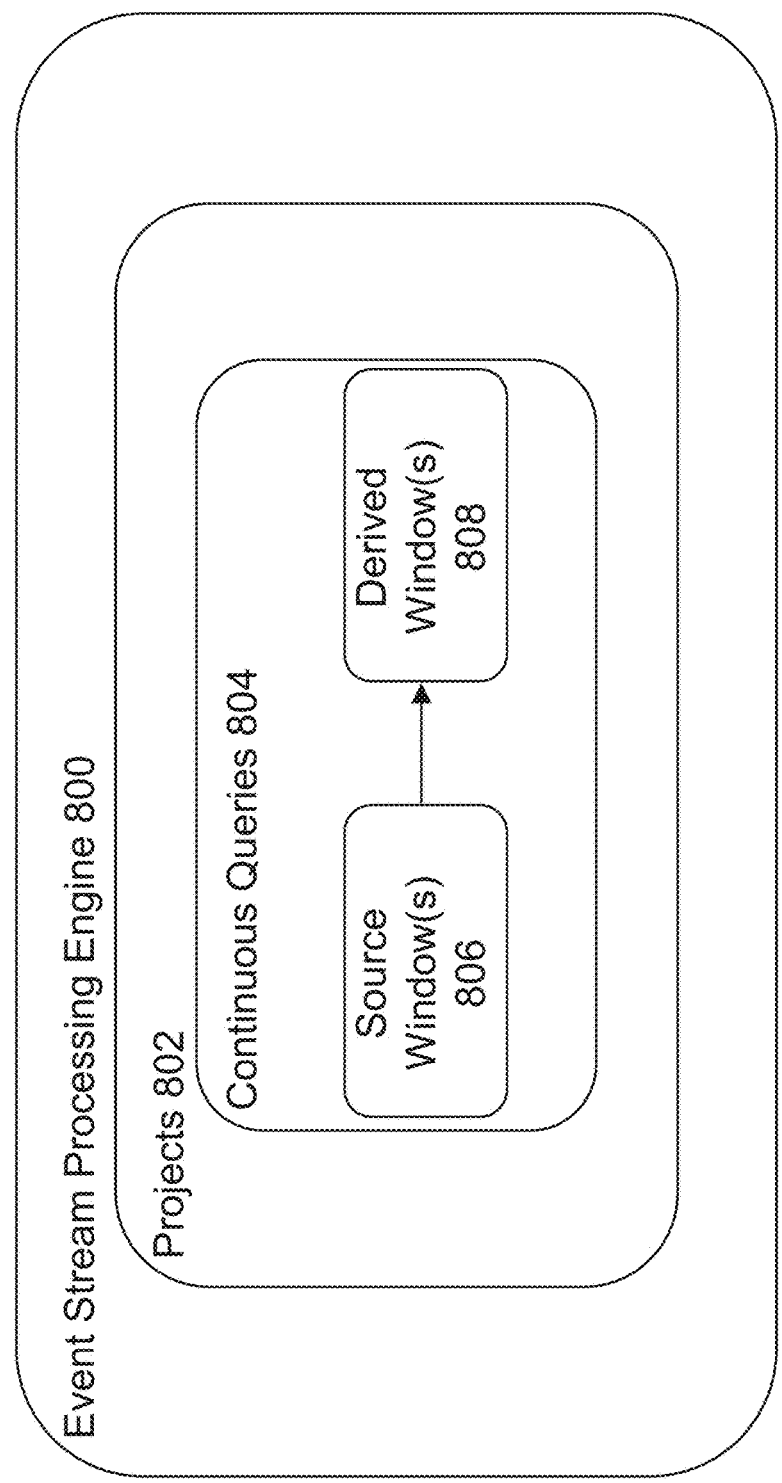
FIG. 8 illustrates a block diagram including components of an Event Stream Processing Engine (ESPE), according to embodiments of the present technology.
Figure 9:
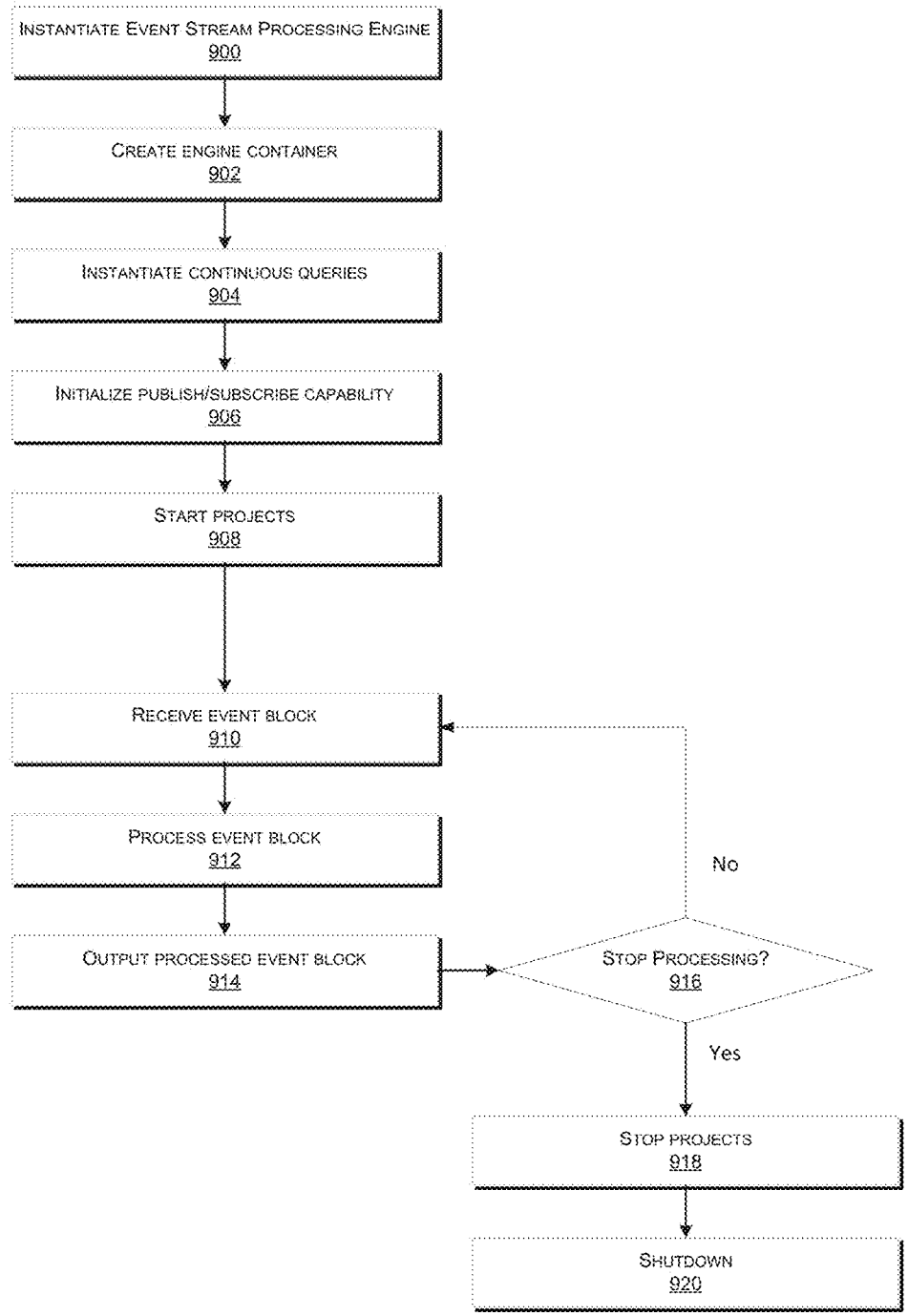
FIG. 9 illustrates a flow chart showing an example process including operations performed by an event stream processing engine, according to some embodiments of the present technology.
Figure 10:
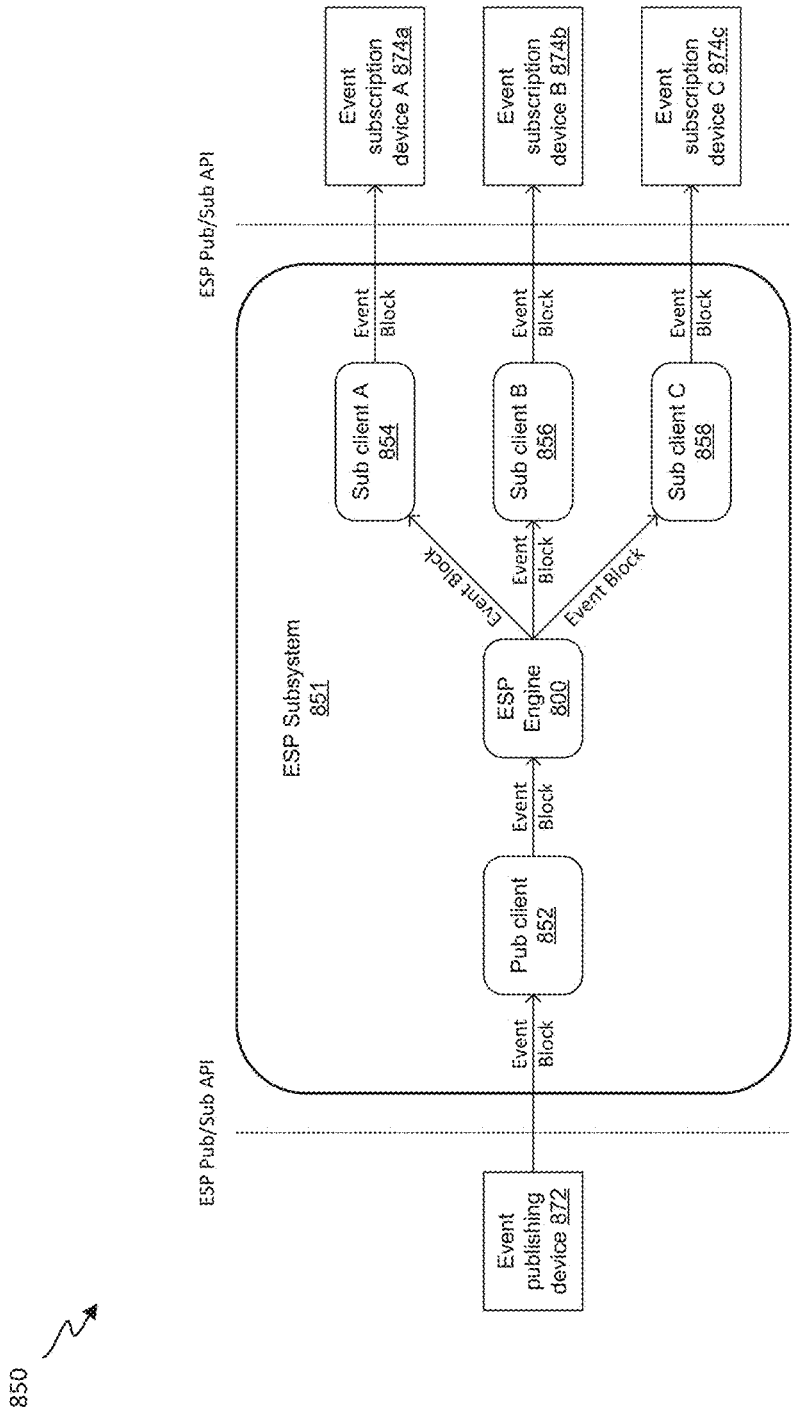
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
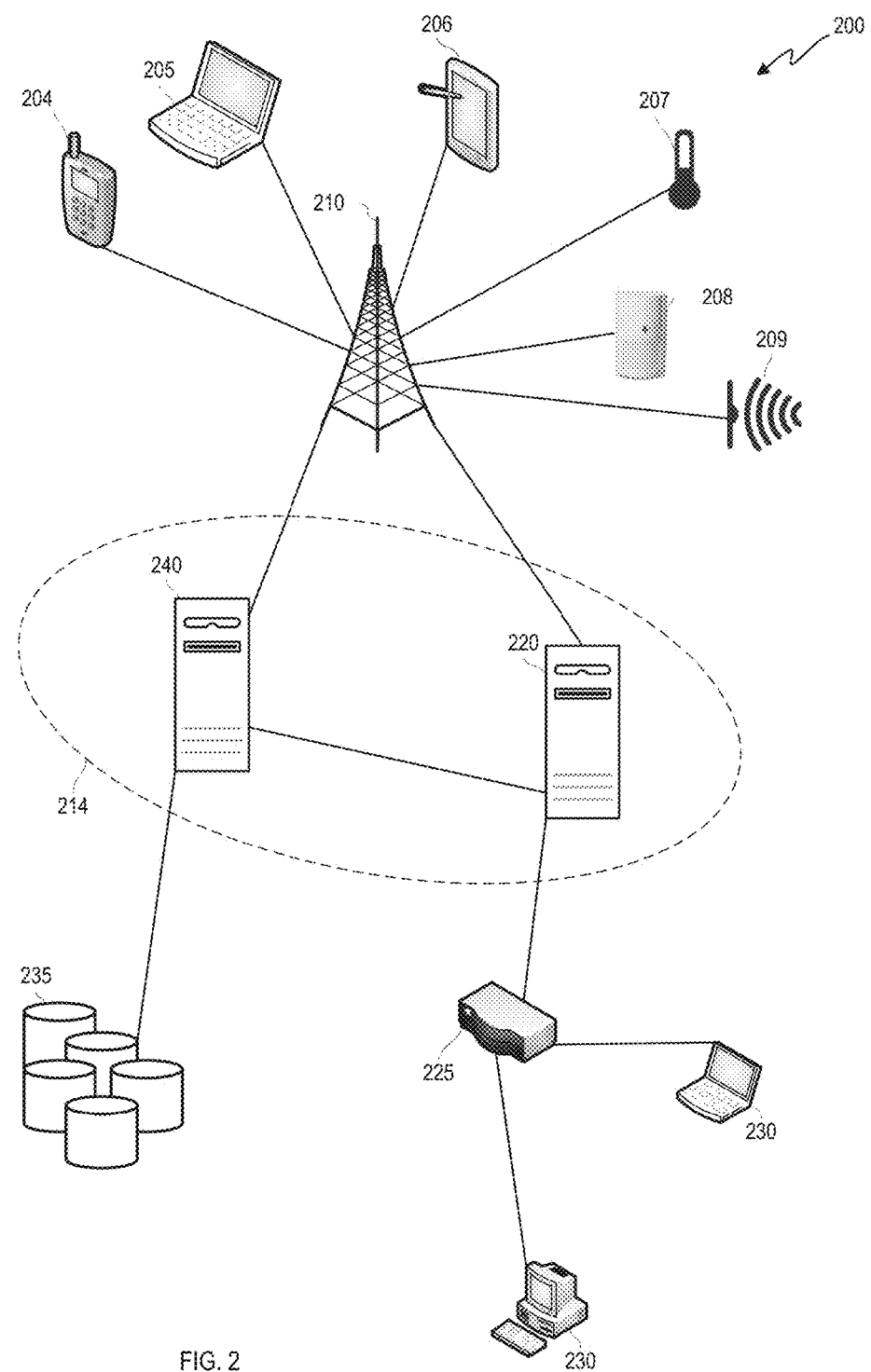
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
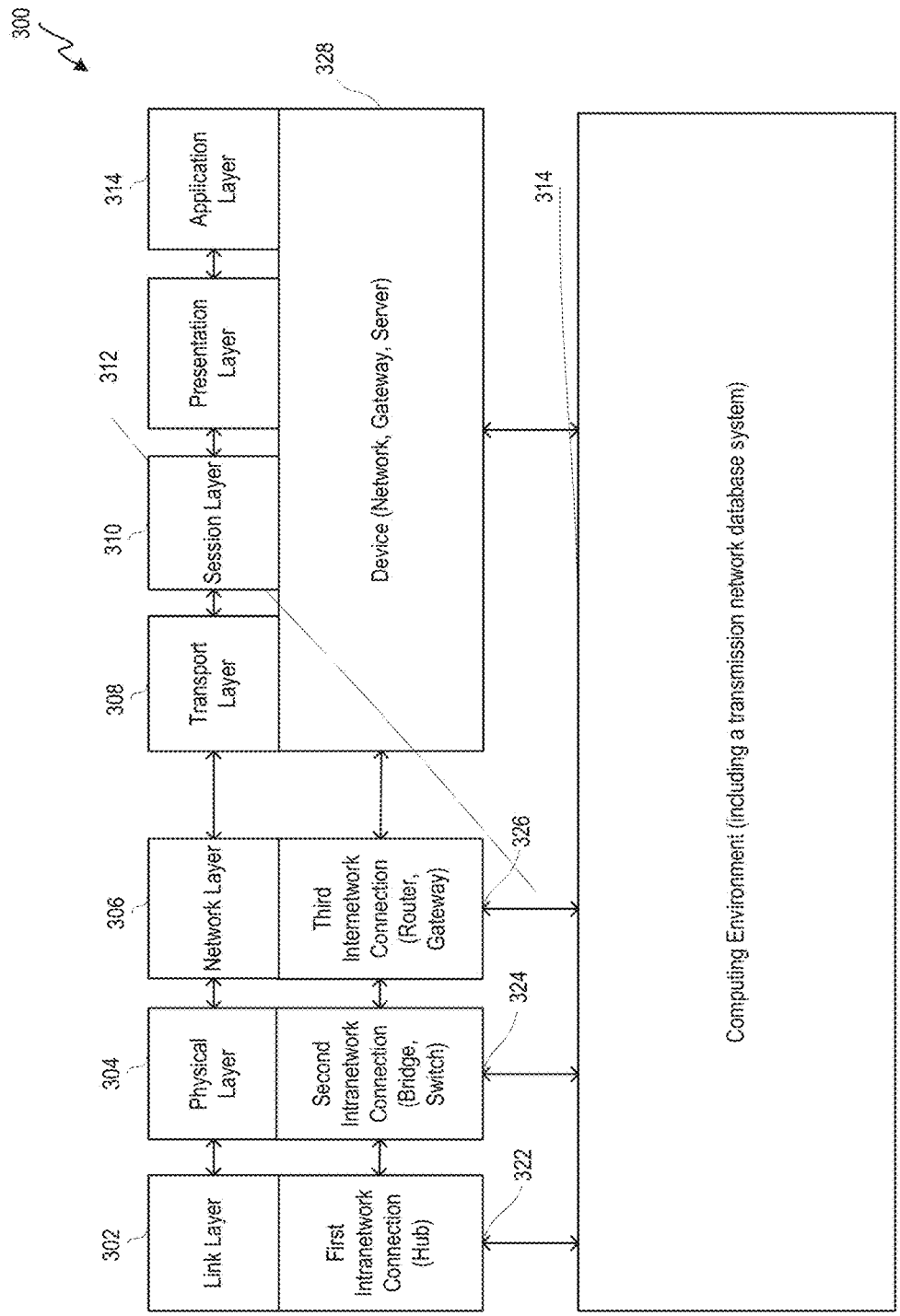
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 30 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
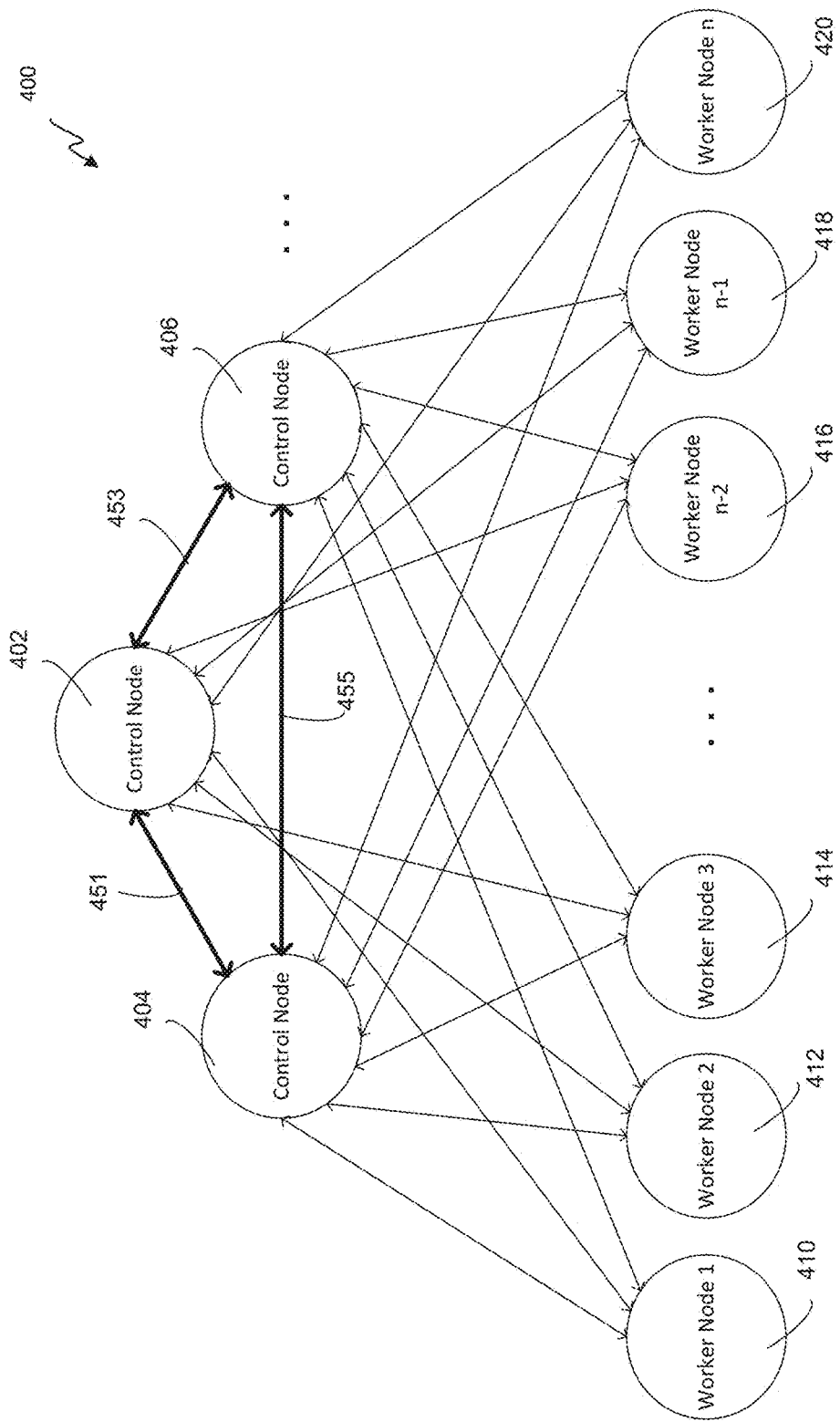
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
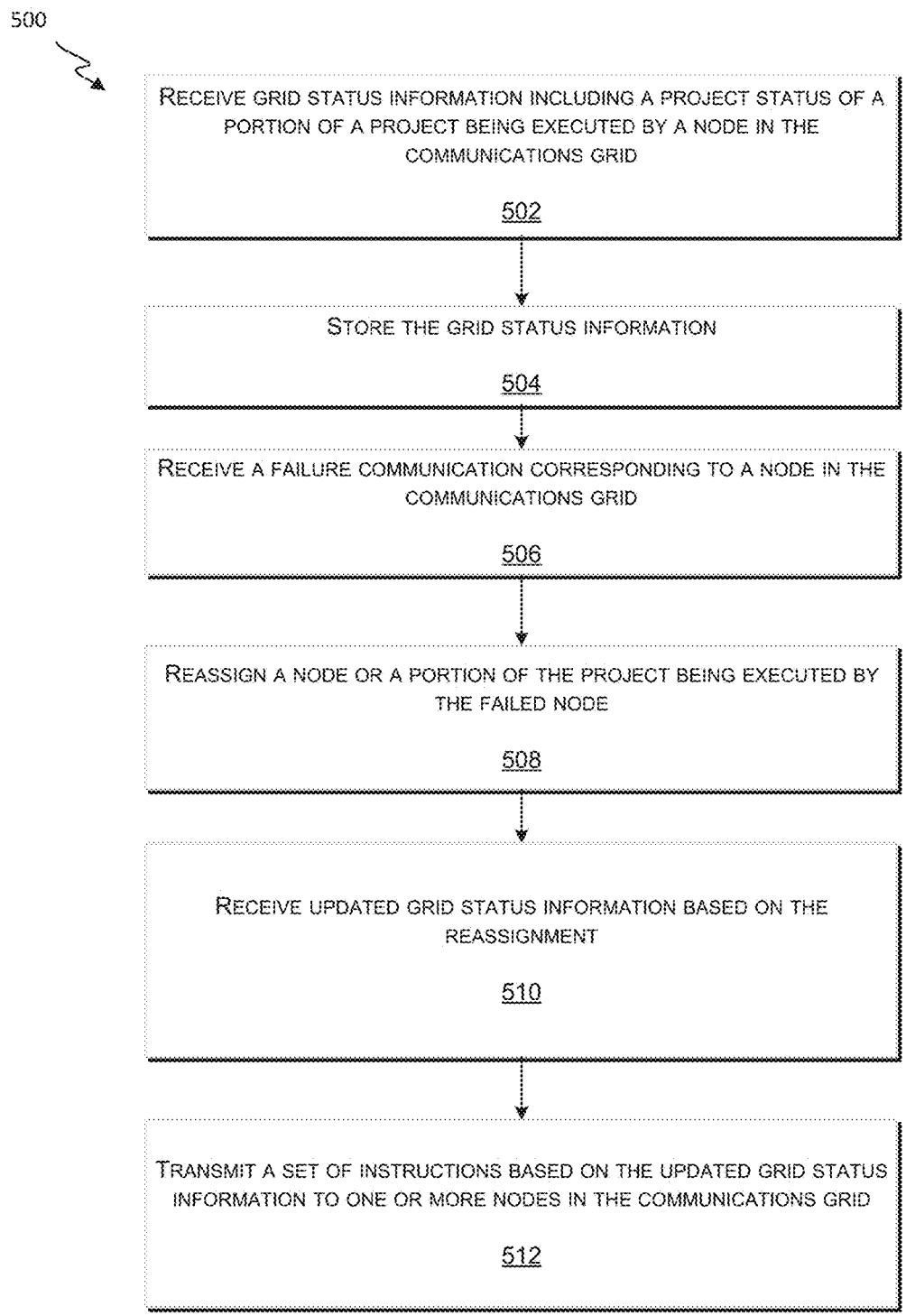
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
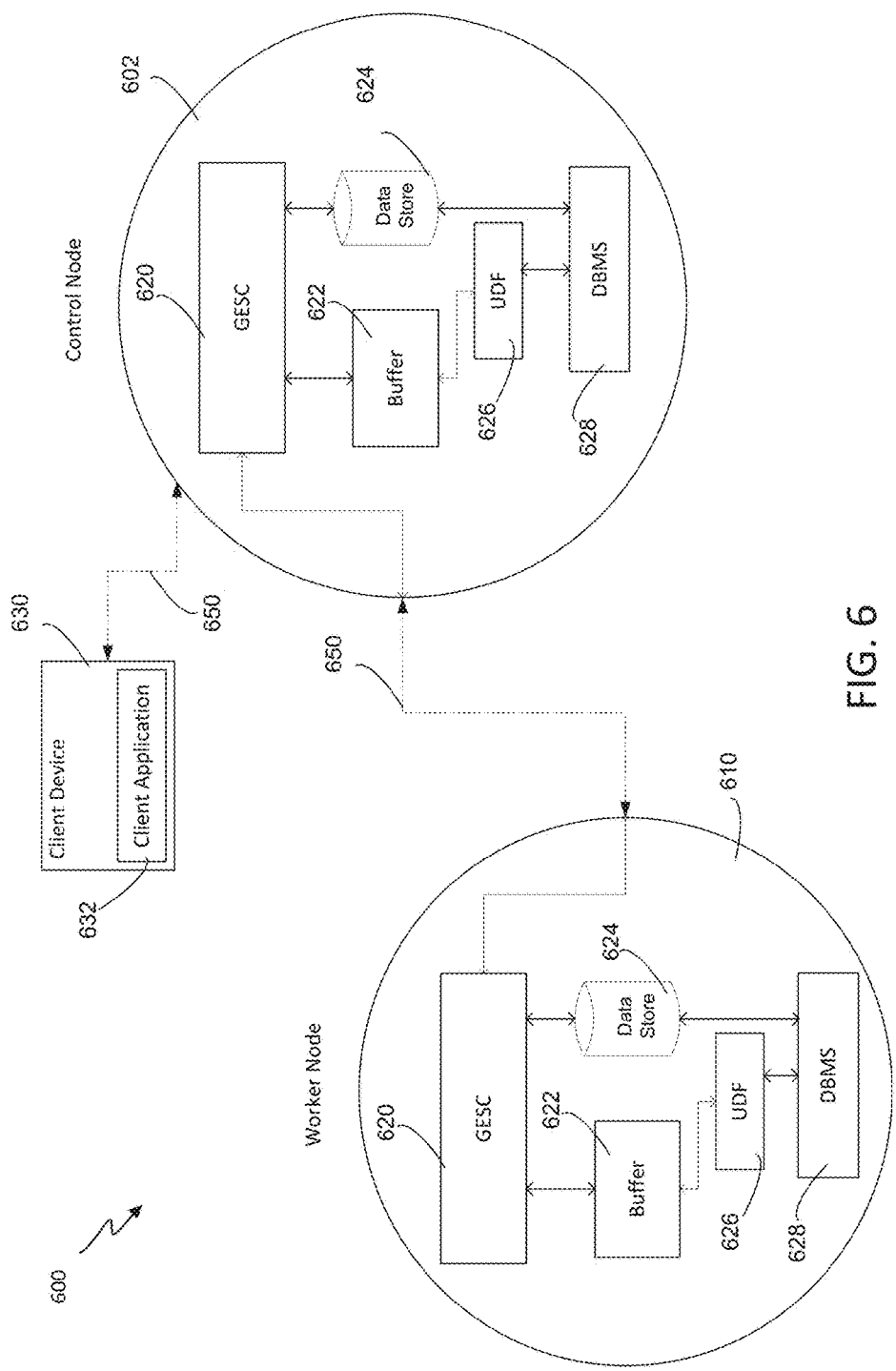
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
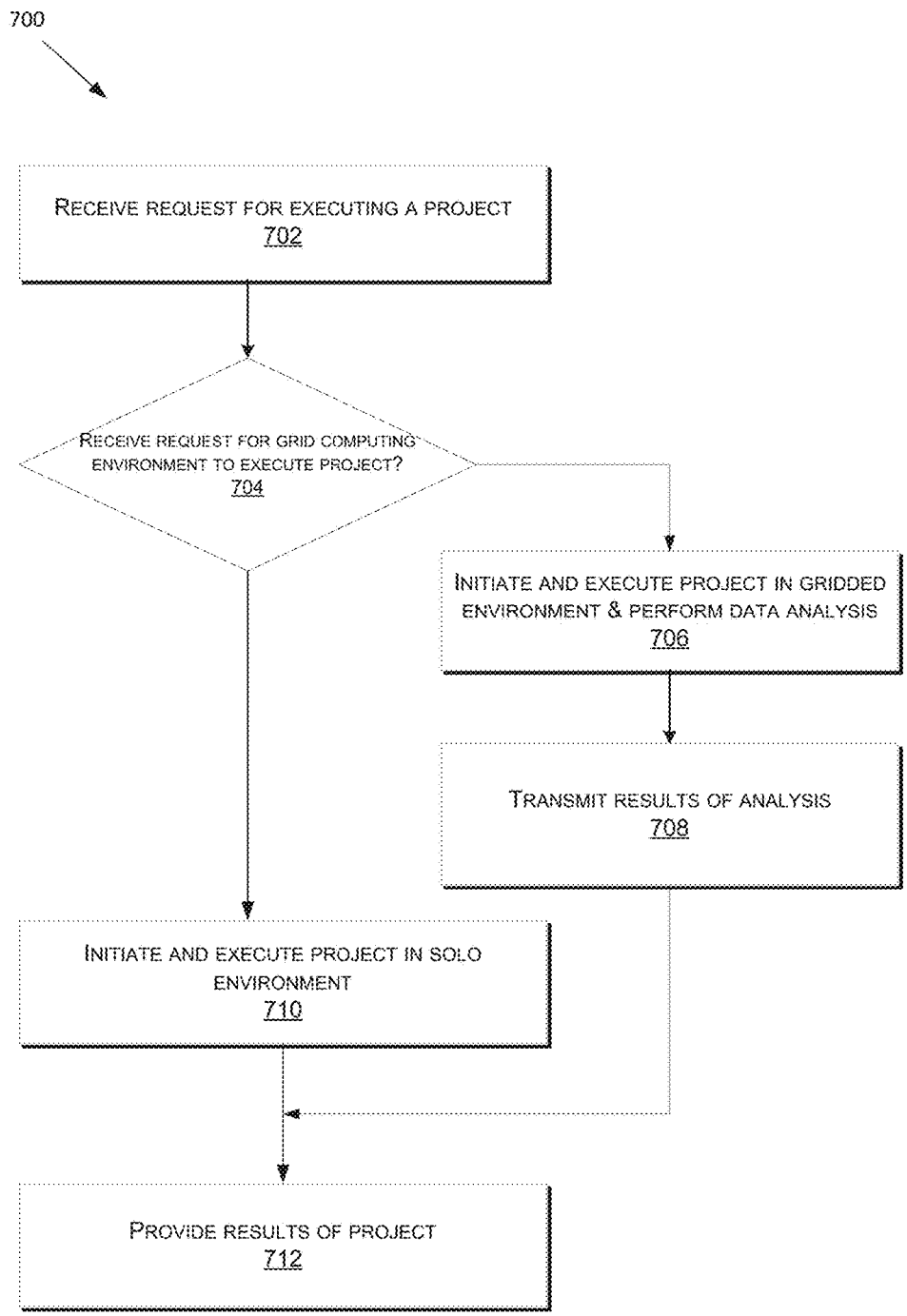
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a-c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874*c*. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874*a*, event subscribing device B 874*b*, and event subscribing device C 874*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874*a*, event subscribing device B 874*b*, and event subscribing device C 874*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874*a* using the publish/subscribe API. Subscribing client B 856 may be started by an event subscription application B executing at event subscribing device B 874*b* using the publish/subscribe API. Subscribing client C 858 may be started by an event subscription application C executing at event subscribing device C 874*c* using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874*a*, event subscription device B 874*b*, and event subscription device C 874*c*. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874*a-c*. For example, subscribing client A 804, subscribing client B 806, and subscribing client C 808 may send the received event block object to event subscription device A 874*a*, event subscription device B 874*b*, and event subscription device C 874*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
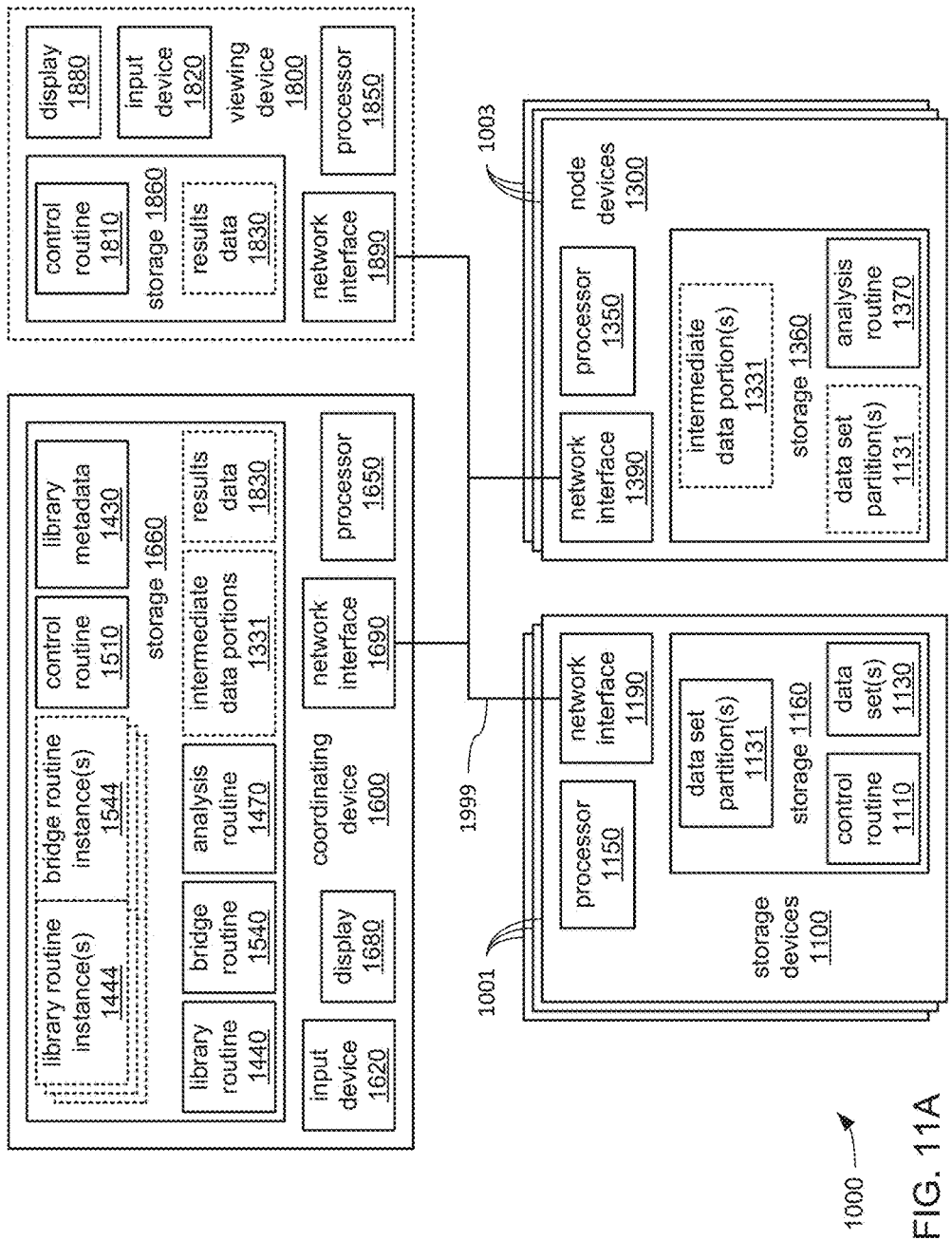
FIGS. 11A and 11B each illustrate an example embodiment of a distributed processing system.
Figure 11B:
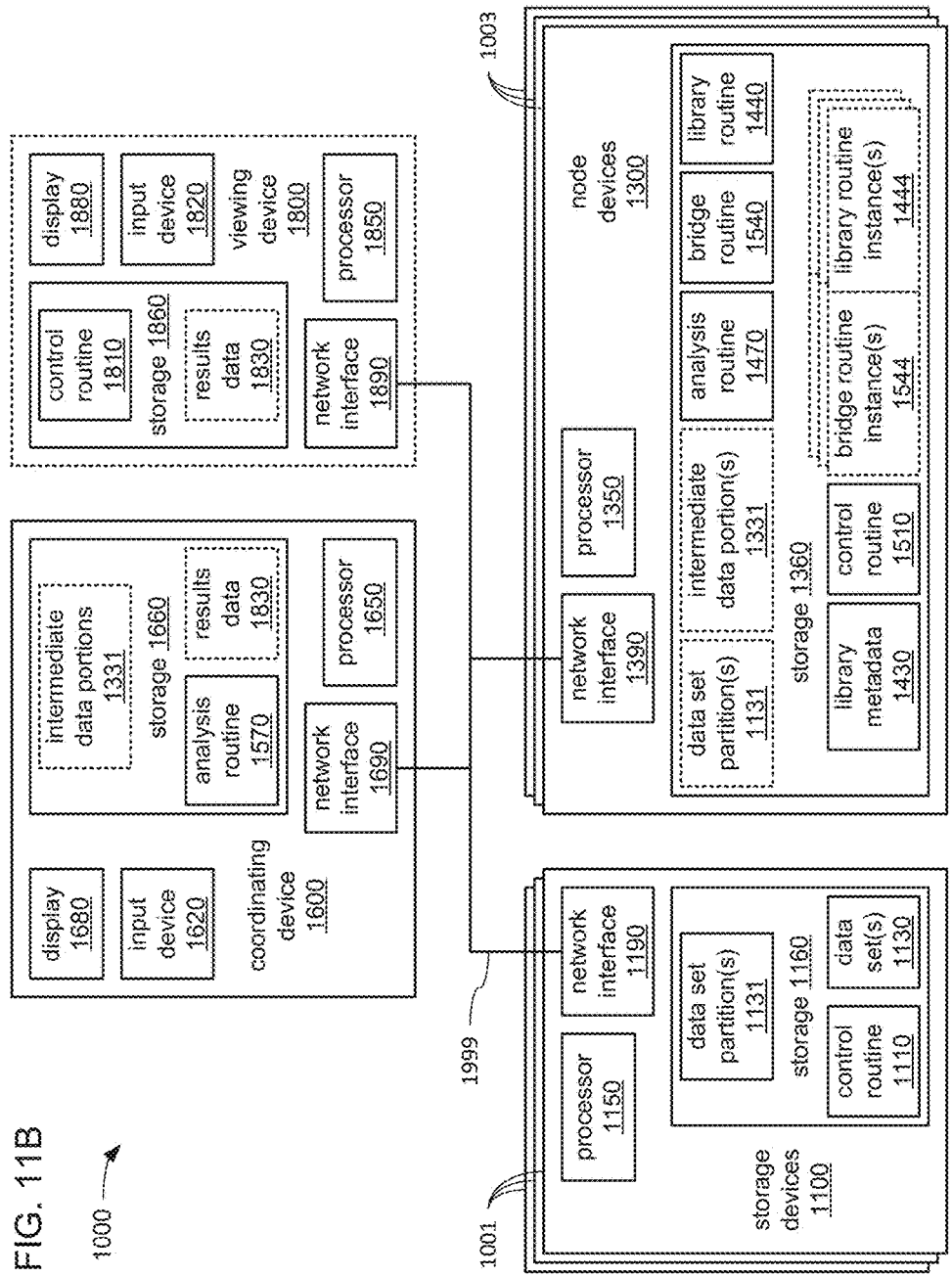

FIG. 11A illustrates a block diagram of an example embodiment of a distributed processing system 1000 incorporating multiple storage devices 1100 that form a storage device grid 1001, multiple node devices 1300 that form a node device grid 1003, a coordinating device 1600 and/or a viewing device 1800. FIG. 11B illustrates a block diagram of an alternate example embodiment of the distributed processing system 1000. In both of the embodiments of FIGS. 11A and 11B, the multiple grid devices 1300 may perform, at least partially in parallel, an analysis of data set partitions 1131 of a data set 1130 that may result in the generation of corresponding intermediate data portions 1331. The coordinating device 1600 may coordinate the at least partially parallel performances of the analysis by the multiple node devices 1300 through a network 1999. As part of serving such a coordinating function, the coordinating device 1600 may also perform a further centralized analysis that may require inputs from the multiple node devices 1300. Thus, the coordinating device 1600 may also generate results data 1830 indicative of the results of the analysis based on the intermediate data portions 1331, which the coordinating device 1600 may receive from the multiple node devices 1300 via the network 1999.

In each of the embodiments of the distributed processing system 1000 of FIGS. 11A and 11B, a multi-threaded analysis routine 1470 makes calls to library functions of a non-threadsafe library routine 1440, and as will be explained, multiple instances of the non-threadsafe library 1440 may be generated for execution within separate single-threaded processes, and may each communicate with the multi-threaded analysis routine 1470 through corresponding instances of a bridge routine 1540. In FIG. 11A, such a combination of the multi-threaded analysis routine 1470 and multiple instances of the non-threadsafe library routine 1440 are executed within the coordinating device 1600. In FIG. 11B, such a combination of the multi-threaded analysis routine 1470 and multiple instances of the non-threadsafe library routine 1440 are executed within each of the multiple node devices 1300.

Referring to both FIGS. 11A and 11B, in various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the storage devices 1100 may incorporate one or more of a processor 1150, a storage 1160 and a network interface 1190 to couple each of the storage devices 1100 to the network 1999. The storage 1160 may store a control routine 1110, one or more data sets 1130, and/or one or more data set partitions 1131. The control routine 1110 may incorporate a sequence of instructions operative on the processor 1150 of each of the storage devices 1100 to implement logic to perform various functions, at least partially in parallel with the processors 1150 of others of the storage devices 1100. In executing the control routine 1140, the processor 1150 of each of the storage devices 1100 may operate the network interface 1190 thereof to receive data items of each of one or more of the data sets 1130 via the network 1999, and may store such data items. The processor 1150 of each of the storage devices 1100 may also generate one or more of the data set partitions 1131, and may operate the network interface 1190 to provide one or more of the data set partitions 1131 to one or more of the node devices 1300 via the network 1999.

Each of the one or more data sets 1130 may include any of a wide variety of types of data associated with any of a wide variety of subjects. By way of example, the data set may include scientific observation data concerning geological and/or meteorological events, or from sensors employed in laboratory experiments in areas such as particle physics. By way of another example, the data set may include indications of activities performed by a random sample of individuals of a population of people in a selected country or municipality, or of a population of a threatened species under study in the wild.

Each of the one or more data sets 1130 may be divisible into multiple ones of the data set partitions 1131 for at least partially parallel transmission, and/or at least partially parallel performance of tasks thereon. Each data set 1130 may be stored as one or more data files, and/or as one or more instances of at least one other type of data structure, in a distributed manner among the multiple storage devices 1100 of the storage device grid 1001. Such distributed storage of a data set 1130 may be carried out to provide redundancy in its storage as a protection against data loss arising from a malfunction or other event associated with one or more of the storage devices 1100. Alternatively or additionally, in embodiments in which a data set 1130 is of considerably large size, such distributed storage of the data set 1130 may be carried out to improve the speed and efficiency with which the data set 1130 is able to be accessed and/or exchanged with other devices, including with the multiple node devices 1300 of the node device grid 1003. Indeed, a data set 1130 may be sufficiently large that there may be no single storage device available that has sufficient storage and/or throughput capacity.

In some embodiments, the processors 1150 of the storage devices 1100 may cooperate to perform a collection function in which each of the processors 1150 operates a corresponding one of the network interfaces 1190 to receive data items of one or more of the data sets 1130 via the network 1999, and may assemble the received data items into the one or more data sets 1130 over a period of time. In such embodiments, data items of a data set 1130 may be received via the network 1999 and/or in other ways from one or more other devices (not shown). By way of example, a multitude of remotely located sensor devices (e.g., geological sensors dispersed about a particular geological region, or particle detection sensors disposed at various portions of a particle accelerator) may generate numerous data items that are then provided via the network 1999 to the storage devices 1100 where the numerous data items are then assembled to form a data set 1130. In other embodiments, the storage devices 1100 may receive one or more of the data sets 1130 from a multitude of other devices (not shown), such as a grid of other node devices. By way of example, such other devices may perform one or more processing operations that generates a data set 1130 (e.g., use a Bayesian analysis to derive a prediction of the behavior of people in a simulation of evacuating a burning building, or to derive a prediction of behavior of structural components of a bridge in response to various wind flows), and may then transmit a data set 1130 as an output to the storage device grid 1001.

In various embodiments, each of the node devices 1300 may incorporate one or more of a processor 1350, a storage 1360 and a network interface 1390 to couple each of the node devices 1300 to the network 1999. The storage 1360 may store one or more data set partitions 1131 and/or intermediate data portions 1331. In various embodiments, the coordinating device 1600 may incorporate one or more of a processor 1650, a storage 1660, an input device 1620, a display 1680, and a network interface 1690 to couple the coordinating device 1600 to the network 1999. The storage 1660 may store the intermediate data portions 1331 and/or the results data 1830.

Turning to FIG. 11A, the storage 1360 of each of the multiple node devices 1300 may additionally store an analysis routine 1370. Within each of the multiple node devices 1300, the analysis routine 1370 may incorporate a sequence of instructions operative on the processor 1350 to implement logic to perform various functions. The storage 1660 of the coordinating device may additionally store library metadata 1430, a library routine 1440, one or more library routine instances 1444, an analysis routine 1470, a control routine 1510, a bridge routine 1540, and/or one or more bridge routine instances 1544. Each of the library routine 1440, the analysis routine 1470, the control routine 1510 and the bridge routine 1540 may incorporate a sequence of instructions operative on the processor 1650 to implement logic to perform various functions.

The processor 1350 of each of the node devices 1300 may be caused to perform the analysis with a corresponding data set partition 1131, at least partially in parallel with the processors 1350 of others of the multiple node devices 1300, as a result of executing the executable instructions of the analysis routine 1370. Correspondingly, the processor 1650 of the coordinating device 1600 may be caused to coordinate the at least partially parallel performances of the analysis by the multiple node devices 1300, and/or to perform the further centralized analysis, as a result of executing executable instructions of one embodiment of the analysis routine 1470. In preparation for execution to cause the processor 1650 to provide such coordination and/or to perform such further centralized analysis, the processor 1650 may be caused by its execution of a control routine 1510 to compile this embodiment of the analysis routine 1470.

Turning to FIG. 11B, the storage 1360 of each of the multiple node devices 1300 may additionally store the library metadata 1430, the library routine 1440, the one or more library routine instances 1444, the analysis routine 1470, the control routine 1510, the bridge routine 1540, and/or the one or more bridge routine instances 1544. Within each of the multiple node devices 1300, each of the library routine 1440, the analysis routine 1470, the control routine 1510 and the bridge routine 1540 may incorporate a sequence of instructions operative on the processor 1350 to implement logic to perform various functions. The storage 1660 of the coordinating device may additionally store an analysis routine 1670. The analysis routine 1670 may incorporate a sequence of instructions operative on the processor 1650 to implement logic to perform various functions.

The processor 1350 of each of the node devices 1300 may be caused to perform the analysis of a corresponding data set partition 1131, at least partially in parallel with the processors 1350 of others of the multiple node devices 1300, as a result of executing the executable instructions of an alternate embodiment of the analysis routine 1470. In preparation for execution to cause each of the processors 1350 to perform the analysis, each of the processors 1350 may be caused by their separate executions of the control routine 1510 to compile corresponding ones of this alternate embodiment of the analysis routine 1470. In contrast to the embodiment of FIG. 11A, the processor 1650 of the coordinating device 1600 may be caused to coordinate the at least partially parallel performances of the analysis by the node devices 1300, and/or to perform the further centralized analysis, as a result of executing executable instructions of the analysis routine 1670.

In the embodiments of both FIGS. 11A and 11B, regardless of whether the analysis routine 1470 is executed by the processor 1650 of the coordinating device or is executed by the processor 1350 of each of the node devices, the analysis routine 1470 may be a multi-threaded routine that is intended to be executed within a single analysis process that includes multiple threads to allow concurrent execution of multiple portions of the analysis routine 1470. However, the analysis routine 1470 may rely on the non-threadsafe library routine 1440 to provide one or more callable library functions, and two or more of the portions of the analysis routine 1470 that are to be executed concurrently on different threads may make function calls to the one or more callable library functions of the non-threadsafe library routine 1440. As will be explained in greater detail, enabling the use of the non-threadsafe library routine 1440 with the multi-threaded analysis routine 1470 may entail instantiating multiple library routine instances 1444 of the library routine 1440 that may each be executed within a separate single-threaded library process, and that may each be made accessible to the analysis routine 1470 via a corresponding one of multiple bridge routine instances 1544 of the bridge routine 1540.

In various embodiments, the viewing device 1800 incorporates one or more of a processor 1850, a storage 1860, an input device 1820, a display 1880, and a network interface 1890 to couple the viewing device 1800 to the network 1999. The storage 1860 may store one or more of a control routine 1810 and the results data 1830. The control routine 1810 may incorporate a sequence of instructions operative on the processor 1850 to implement logic to perform various functions. The processor 1850 may be caused by its execution of the control routine 1810 to operate the network interface 1890 to receive the results data 1830 from one of the node devices 1300) or from the coordinating device 1600 via the network 1999. In some embodiments, the processor 1850 may also be caused to generate a visualization based on the results data 1830 to present a depiction of the results of the performance of the analysis by the multiple node devices 1300 of the node device grid 1003 on the display 1880.

Figure 12:
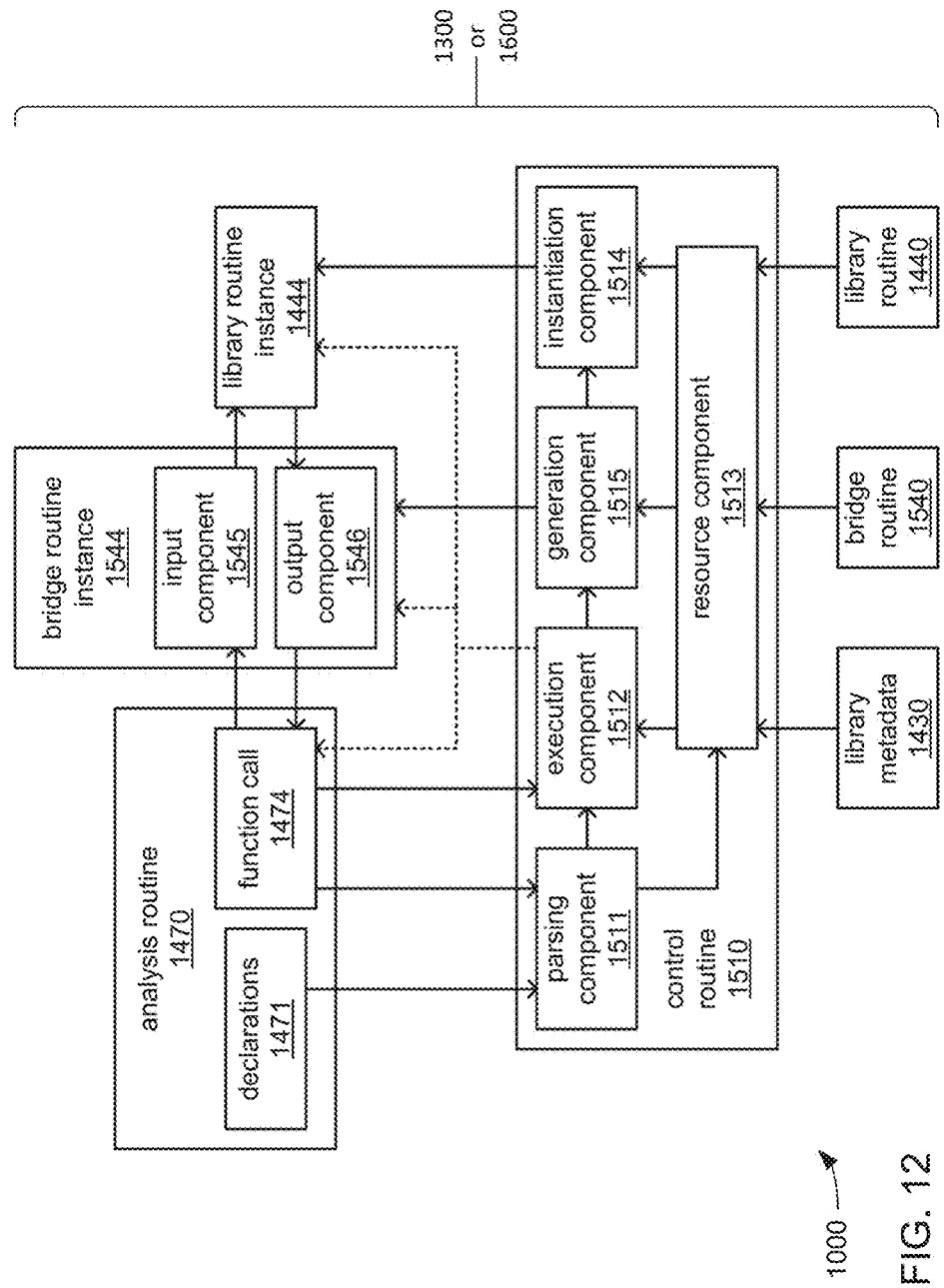
FIG. 12 illustrates an example of preparation and execution of a multi-threaded analysis routine and a non-threadsafe library routine in a distributed system.

FIG. 12 illustrates an example of preparing and executing the analysis routine 1470 in conjunction with at least one instance of the library routine 1440. More specifically, FIG. 12 illustrates aspects of enabling the multi-threaded analysis routine 1470 to use library functions of the non-threadsafe library routine 1440 during execution of the analysis routine 1470, either within the coordinating device 1600 as depicted in FIG. 11A, or within each of the multiple node devices 1300 as depicted in FIG. 11B.

As recognizable to those skilled in the art, each of the library routine 1440, the analysis routine 1470, the control routine 1510 and the bridge routine 1540, including the components of which each may be composed, are selected to be operative on whatever type of processor or processors that are selected to implement applicable ones of the processors 1350 and/or 1650. Further, library routine instances 1444 generated from the library routine 1440 and/or bridge routine instances 1544 generated from the bridge routine 1540 may be similarly operative on whatever type of processor or processors are selected to implement applicable ones of the processors 1350 and/or 1650. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 1350 and/or 1650. Where one or more device drivers are included, those device drivers may provide support for any of a variety of other components, whether hardware or software components, of the node devices 1300 and/or the coordinating device 1600.

Figure 13A:
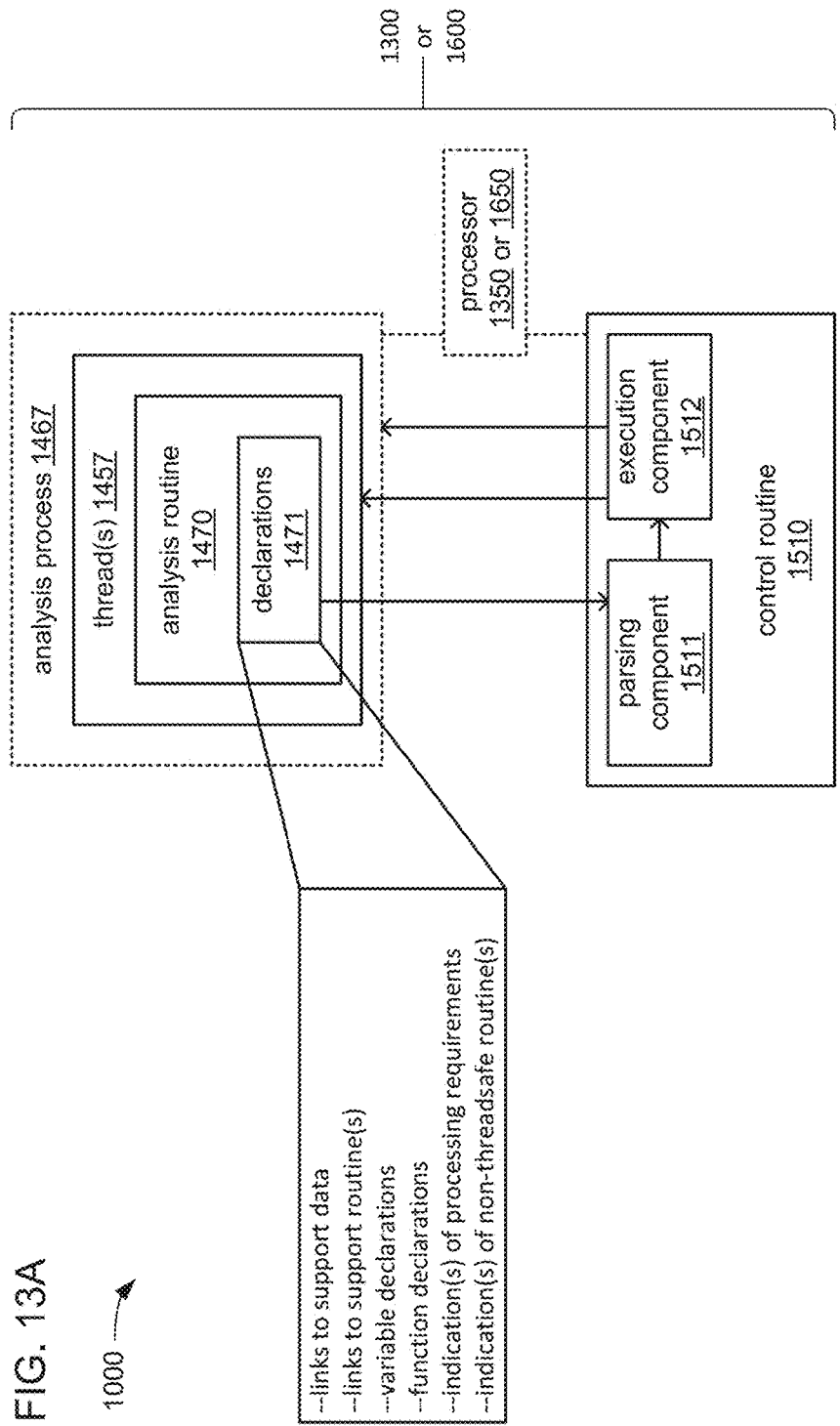
FIGS. 13A and 13B, together, illustrate an example of preparation of a multi-threaded analysis routine for execution.
Figure 13B:
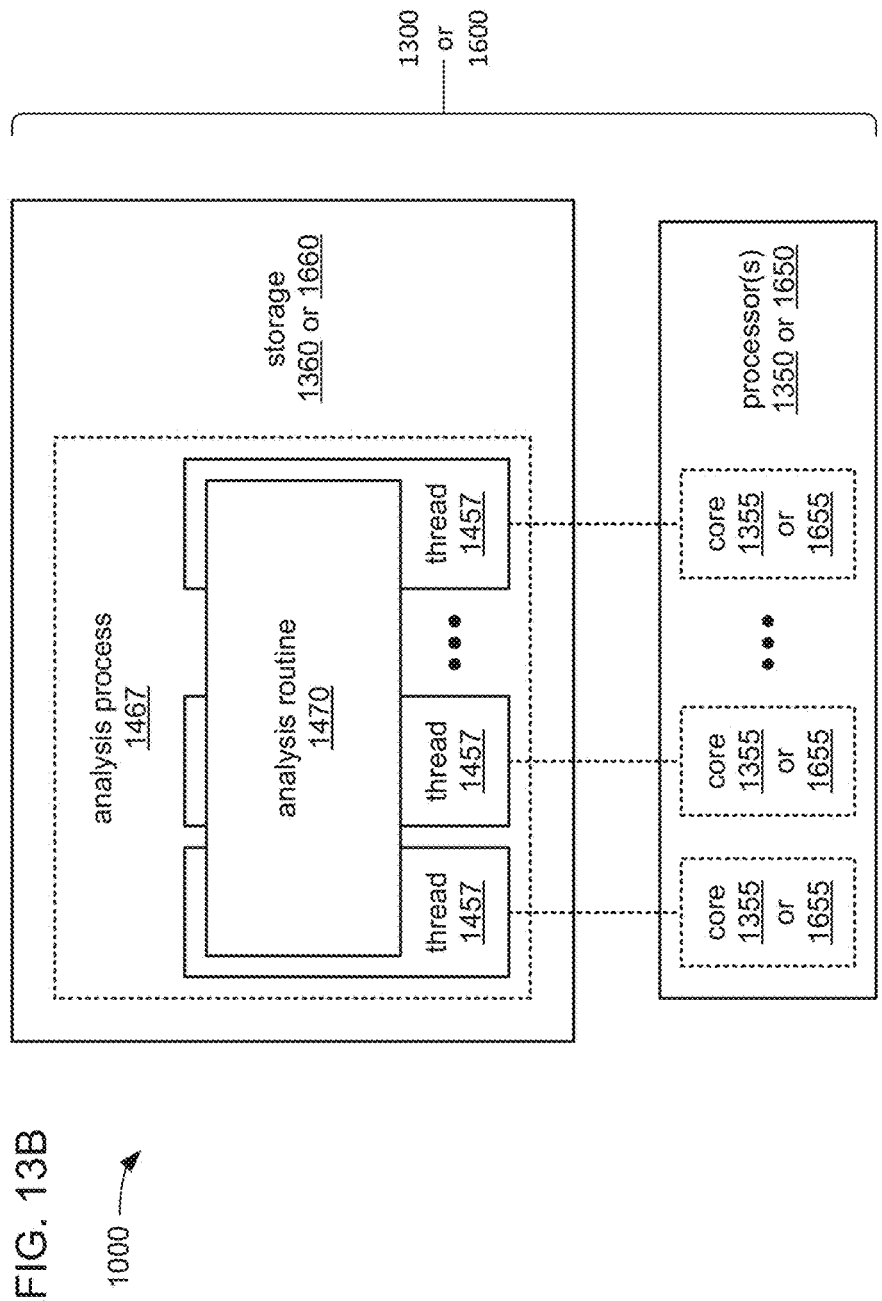

As depicted, the control routine 1510 executed either by the processor 1650 of the coordinating device 1600 or the processor 1350 of each of the multiple node devices 1300 may include a parsing component 1511 to parse declarations 1471 of the analysis routine 1470 to determine various aspects of the analysis routine 1470. As also depicted, the control routine 1510 may include an execution component 1512 to prepare the analysis routine 1470 for execution based, at least in part, on the determination. FIGS. 13A-B depict aspects of making such a determination and/or of making such preparations for execution of the analysis routine 1470 in greater detail.

Turning to FIG. 13A, in executing the control routine 1510, either the processor 1350 or 1650 may be caused by execution of the parsing component 1511 to parse the source code of the analysis routine 1470 to determine whether the analysis routine 1470 is a multi-threaded routine. More precisely, the source code of the analysis routine 1470 may be parsed to determine whether the analysis routine 1470 is written to enable multiple portions of the analysis routine 1470 to be executed concurrently across multiple threads.

As will be familiar to those skilled in the art, depending at least on the programming language in which the source code of the analysis routine 1470 was written, there may be one or more declarations 1471 incorporated into the source code of the analysis routine 1470. The declarations 1471 may include definitions of variables and/or functions to be instantiated and/or used during the execution of the analysis routine 1470. Alternatively or additionally, the declarations 1471 may include references to data structure definitions and/or functions in other pieces of source code that may be relied upon during execution of the analysis routine 1470. Also alternatively or additionally, the declarations 1471 may include indications of processing and/or storage requirements to support the execution of the analysis routine 1470.

Thus, the exact manner in which there may be an indication within the source code of whether the analysis routine 1470 is a multi-threaded routine may vary. In embodiments in which the source code includes the declarations 1471, there may be a compiler directive that explicitly indicates support for the use of multiple threads, a reference to a header file that is associated with multi-threaded execution, or still another indication that the analysis routine 1470 is written to enable multi-threaded execution. Alternatively or additionally, where the declarations 1471 make reference to a header file or other piece of source code in addition to the source code of the analysis routine 1470, such other source code may include declarations (not shown) that may provide an indication that the analysis routine 1470 is multi-threaded. Where there is such other source code associated with the analysis routine 1470, it may be parsed for such an indication. Again, such an indication may be a compiler directive explicitly indicating support for multiple threads, or still another indication that the analysis routine 1470 is written to enable multi-threaded execution.

By way of example, where the analysis routine is written to make use of the multi-threaded capabilities of a GPU incorporated into the coordinating device 1600 and/or each of the multiple node devices 1300 (e.g., a GPU serving as at least a component of the processor 1650 or 1350, respectively), there may be a reference in the declarations 1471 to a header file associated with using hardware-based support for multiple threads provided by such a GPU. Thus, in parsing the declarations 1471, the processor 1350 or 1650 may be caused by the parsing component 1511 to identify that reference to such a header file as an indication that the analysis routine 1470 is multi-threaded.

In executing the control routine 1510, the processor 1350 or 1650 may be caused by execution of the execution component 1512 to instantiate an analysis process 1467. In response to a determination that the analysis routine 1470 is a multi-threaded routine, the processor 1350 or 1650 may be further caused to instantiate multiple threads 1457 within the analysis process 1467. Thus, the analysis process 1467 may be generated as a multi-threaded process within which the multiple portions of the analysis routine 1470 may be executed concurrently across the multiple threads 1457.

Turning to FIG. 13B, as will be familiar to those skilled in the art, regardless of the quantity of threads 1457 supported within the analysis process 1467, instantiating the analysis process 1467 may entail allocating at least one portion of storage space for the execution of the analysis routine 1470 within either the storage 1660 of the coordinating device or the storage 1360 of each of the multiple node devices 1300. As will also be familiar to those skilled in the art, the manner in which multiple threads 1457 are allocated for the analysis process 1467 may vary depending on one or more aspects of processor architecture. In some embodiments, the processor 1350 or 1650 may not incorporate hardware-based multi-threading support. In such embodiments, time slicing to share a single processing core 1355 or 1655 of the processor 1350 or 1650, respectively, may be employed to provide the multiple threads 1457. However, in other embodiments, the processor 1350 or 1650 may provide hardware-based multi-threading support in which each of the multiple threads 1457 may be supported with a separate dedicated processing core 1355 or 1655, respectively, as depicted in FIG. 13B.

Returning to FIG. 12, as depicted, the control routine 1510 may include a resource component 1513 to retrieve one or more resources required to at least prepare for the execution of at least the library routine 1440. As also depicted, the control routine 1510 may include an instantiation component 1514 to generate one or more of the library routine instances 1444 of the library routine 1440, and/or a generation component 1515 to generate one or more bridge routine instances 1544 of the bridge routine 1540. FIGS. 14A-D depict aspects of such generation of the library routine instances 1444 and/or the bridge routine instances 1544 in greater detail.

Figure 14A:
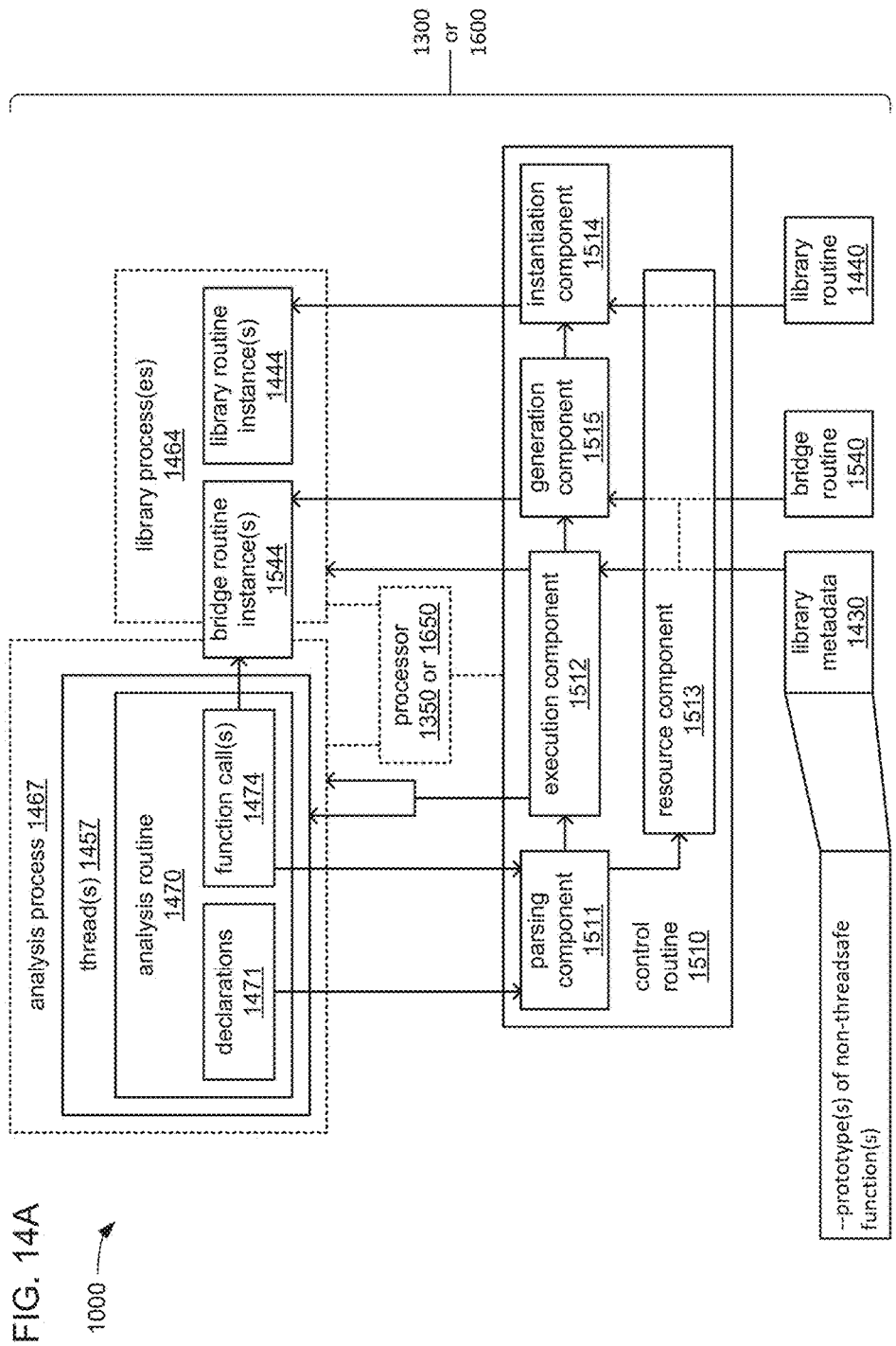
FIGS. 14A, 14B, 14C and 14D, together, illustrate an example of preparation of a non-threadsafe library routine for execution.

Turning to FIG. 14A, upon determining that the analysis routine 1470 is multi-threaded, as described above, the processor 1350 or 1650 may be caused by the parsing component 1511 to additionally parse the source code of the analysis routine 1470 for an indication that multiple portions of the analysis routine 1470 that are to be executed on different threads 1457 may make function calls 1474 to one or more library functions of the library routine 1440. Such additional parsing may be performed to identify all library routines to which function calls 1474 may be made from within the analysis routine 1470. In embodiments in which the source code of the analysis routine 1470 includes the declarations 1471, such parsing may be of the declarations 1471 to identify all library routines referred to in the declarations 1471.

As each library routine is so identified, the processor 1350 or 1650 may be caused by execution of the resource component 1513 to search for and retrieve any library metadata that may be associated with each identified library routine. In so doing, the library metadata 1430 associated with the library routine 1440 may be found and retrieved. In some embodiments, such library metadata may be generated only for library routines that are non-threadsafe such that the fact that the library metadata 1430 was found may serve as an indication that the library routine 1440 is non-threadsafe. Alternatively or additionally, the library metadata 1430 associated with the library routine 1440 may include an explicit indication that the library routine 1440 is non-threadsafe.

In some embodiments, the library metadata 1430 may include prototypes of one or more of the callable library functions of the library routine 1440, and/or descriptive information concerning the callable library functions provided in any of a variety of other forms. Among the details of the library functions that may be provided in the metadata 1430 may be the parameters, variables and/or other information that are to be provided to each of the callable library functions when called, as well as parameters, variables and/or other information that is to be provided by each of the callable library functions upon completion of their execution in response to being called.

Following the identification of the library routine 1440 as being a non-threadsafe library routine that includes library functions that are called from within the analysis routine 1470, an assumption may be made in some embodiments that such function calls emanate from multiple portions of the analysis routine 1470 that are to be executed on different threads 1457. Alternatively, following identification of the library routine 1440 as being a non-threadsafe library routine that includes library functions that are called from within the analysis routine 1470, the processor 1350 or 1650 may be caused by the parsing component 1511 to parse other portions of source code of the analysis routine 1470 beyond any declarations 1471 to identify each function call 1474 made to a library function of the library routine 1440. Such parsing may also be used to identify which of the threads 1457 is associated with each such function call 1474 to the library routine 1440 to confirm whether such function calls 1474 are associated with only a single one of the threads 1457 or are associated with multiple ones of the threads 1457.

In response to a determination that such function calls 1474 are to be made from multiple portions of the analysis routine 1470 that are to be executed on multiple ones of the threads 1457 (either as a result of the assumption being made that this is the case or as a result of confirmation that this is the case from further parsing), the processor 1350 or 1650 may be caused to generate multiple isolated instances of the library routine 1440. More specifically, the processor 1350 or 1650 may be caused by the execution component 1512 to instantiate multiple library processes 1464. Where, as discussed above, the assumption is made without confirmation that such function calls 1474 will emanate from multiple portions of the analysis routine 1470 executed on multiple threads 1457, a separate library process 1464 may be instantiated for each of the threads 1457 without any attempt being made to confirm which one(s) of the threads 1457 will be the one(s) from which such function calls 1474 will emanate. Alternatively, where further parsing has been done to confirm that such function calls 1474 will emanate from multiple portions of the analysis routine 1470 executed on multiple threads 1457, a separate library process 1464 may be instantiated for each of the threads 1457 on which it has been confirmed that a portion of the analysis routine 1470 will be executed that will make such function calls 1474.

Following the instantiation of multiple ones of the library processes 1464 (regardless of the basis on which the multiple library processes 1464 are instantiated), the processor 1350 or 1650 may be caused by the resource component 1513 to also retrieve the library routine 1440. The processor 1350 or 1650 may then be caused to generate, from the retrieved library routine 1440, a separate one of the library routine instances 1444 within each of the instantiated library processes 1464 by execution of the instantiation component 1514. Again, the instantiation of each of the library processes 1464 may entail the allocation of at least one separate portion of the storage 1360 or 1660 for each one of the library processes 1464. As a result, each of the library routine instances 1444 generated within one of the library processes 1464 is isolated from all of the others to at least the extent that none of the of the library routine instances 1444 share a portion of storage space with any of the others, thereby at least avoiding collisions in the use of variables.

Figure 14B:
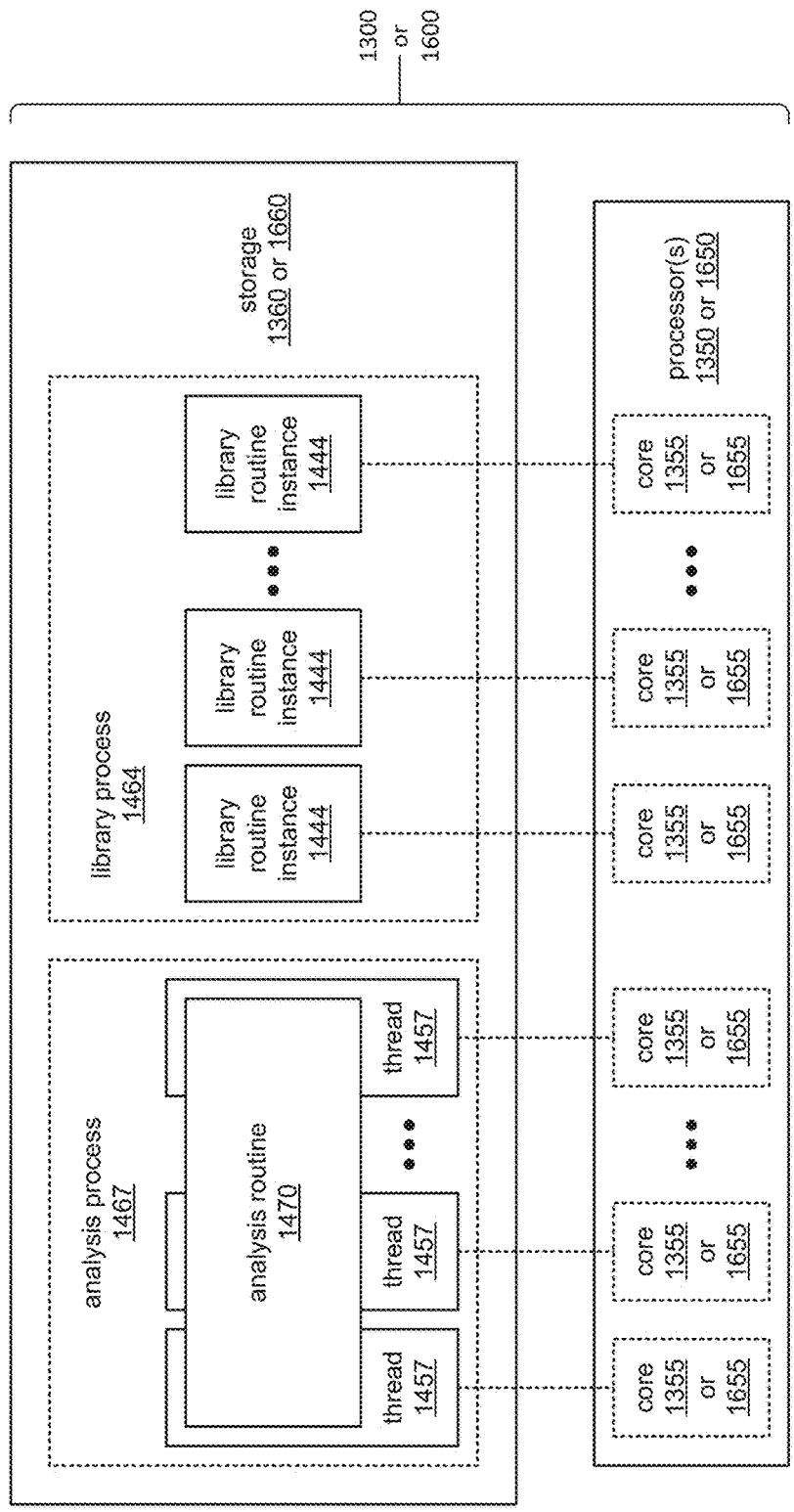

Turning to FIG. 14B, as was discussed in reference to FIG. 13B, the manner in which the multiple threads 1457 are allocated to and/or otherwise associated with the analysis process 1467 may vary depending on one or more aspects of processor architecture. Again, in some embodiments, the processor 1350 or 1650 may be capable of providing hardware-based multi-threading support in which each of multiple threads 1457 may be supported with a separate dedicated processing core 1355 or 1655, respectively. Thus, as depicted, each of the multiple portions of the analysis routine 1470 that is written to be executed on a separate one of multiple threads 1457 may be so executed by a separate one of multiple processing cores 1355 or 1655. Additionally, and as also depicted, the single thread of each of the library processes 1464 may be executed by a separate one of the multiple processing cores 1355 or 1655.

Returning to FIG. 14A, the processor 1350 or 1650 may be caused by resource component 1513 to further retrieve the bridge routine 1540. The processor 1350 or 1650 may then be caused to generate, from the retrieved bridge routine 1540, a separate one of the bridge routine instances 1544 for each one of the library routine instances 1444 by execution of the generation component 1515. Through separate ones of the bridge routine instances 1544, each one of the library routine instances 1444 may be made accessible to its corresponding portion of the analysis routine 1470 executed on a corresponding one of the threads 1457.

Figure 14C:
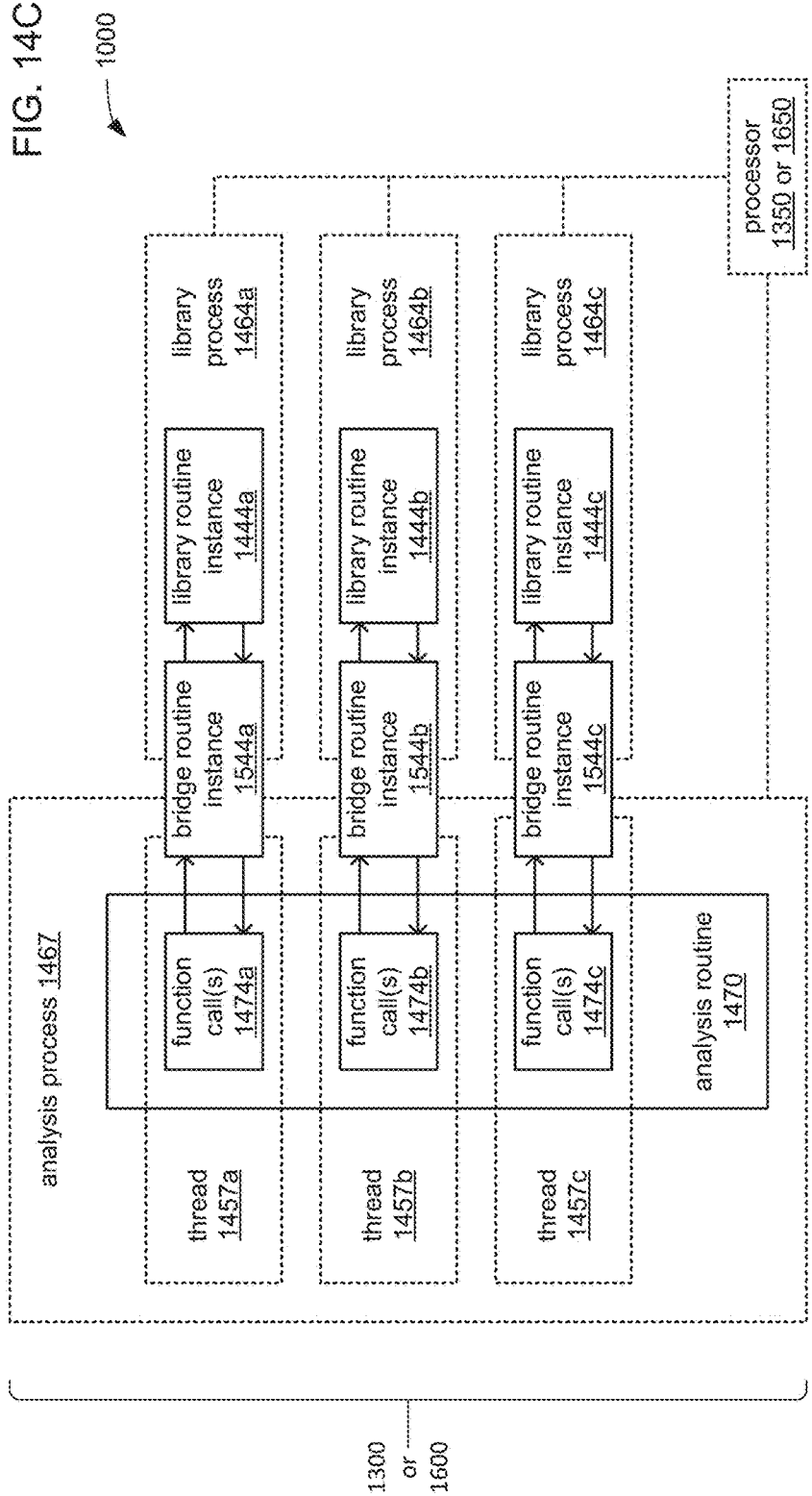

FIG. 14C depicts an example of such separation between instances of the library routine 1440 in greater detail. As depicted in this example, three portions of an example embodiment of the analysis routine 1470 are to be executed across three threads 1457*a*, 1457*b* and 1475*c* of an example of the analysis process 1467. As also depicted, each of the portions of this example analysis routine 1470 that is executed on a different one of the threads 1457*a-c* includes at least one function call 1474*a-c*, respectively, to a library function of the library routine 1440. However, as has been discussed, to overcome the non-threadsafe characteristic of the library routine 1440, three separate library routine instances 1444*a-c* have been generated within corresponding separate single-threaded library processes 1464*a-c*, respectively. Again, with these three instances of the library routine 1440 so separated through their assignments to be separately executed within different ones of the library processes 1464*a-c*, respectively, various issues associated with being non-threadsafe may be entirely precluded. For example, collisions between variables that would occur if the multiple instances 1444*a-c* shared storage space allocated to only one process may be prevented. As further depicted, to enable the calling of library functions, bridge routine instances 1544*a-c* may be generated and interposed between the portions of the analysis routine 1470 executed on threads 1457*a-c* within the analysis process 1467 and the library routine instances 1444*a-c* that are each executed within a separate one of the library processes 1464*a-c*, respectively.

Figure 14D:
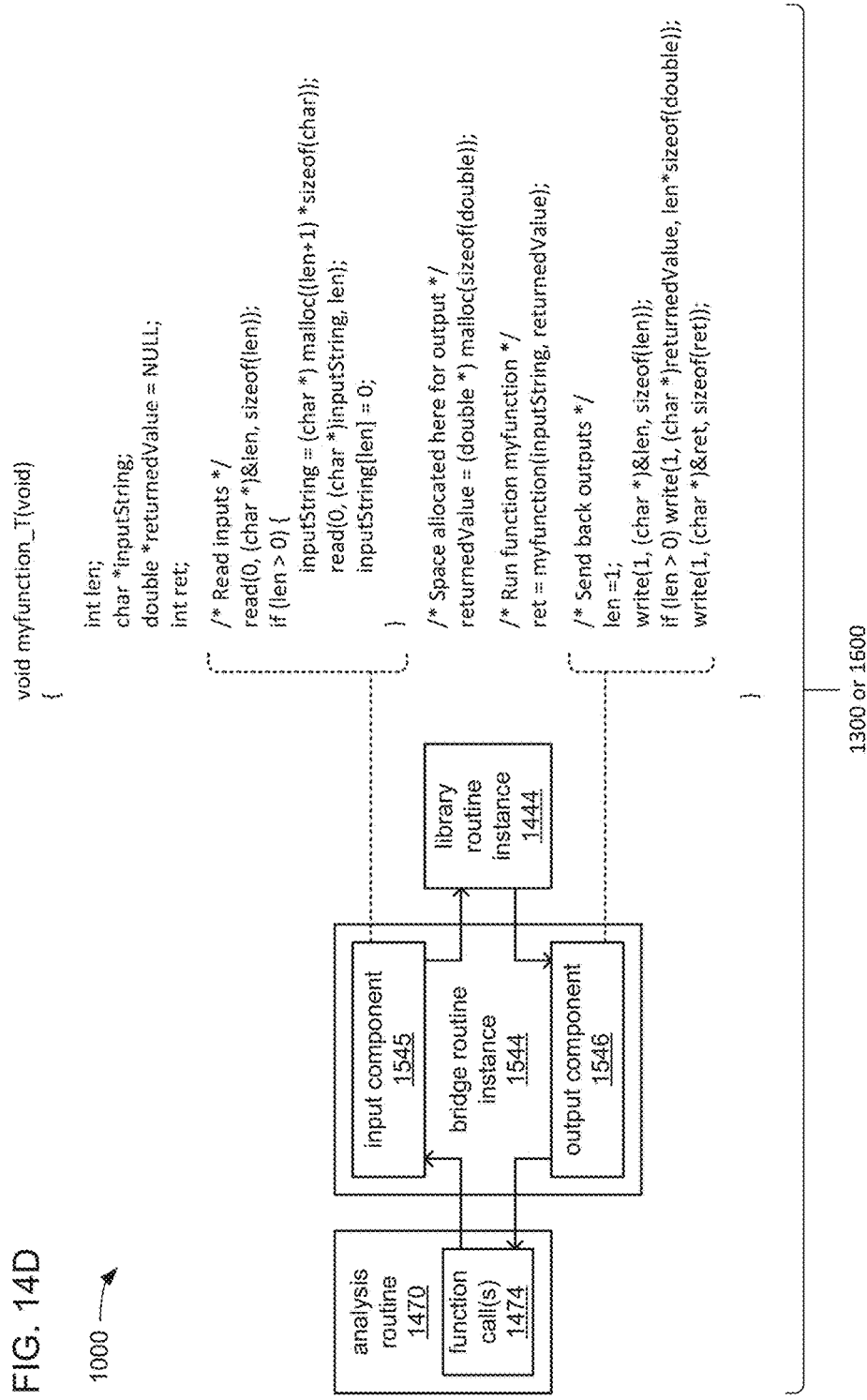

Turning to FIG. 14D, as depicted, each bridge routine instance 1544 (such as each of the bridge routine instances 1544*a-c* of FIG. 14C) may include an input component 1545 that relays parameters and/or other information provided in a function call 1474 to a library function of the library routine instance 1444 that is called via the function call. Correspondingly, each bridge routine instance 1544 may also include an output component 1546 that relays the results of the performance of the called library function back to the portion of the analysis routine 1470 from which the function call 1474 was made. Stated differently, each bridge routine instance 1544 may serve as a bidirectional buffer between a portion of the analysis routine 1470 executed on one of the threads 1457 (such as one of the threads 1457*a-c* of FIG. 14C) and one of the library routine instances 1444.

As depicted with example lines of source code, in FIG. 14D, each bridge routine instance 1544 may be generated by the generation component 1515 to include lines of source code that enable function calls 1474 to call into a portion of the source code of the bridge routine instance 1544 that emulates enough of the library functions being called to enable the bridge routine instance 1544 to serve as the aforedescribed buffer. Such lines of code may be generated based on the information provided within the library metadata 1430 concerning each of the library functions of the library routine 1440 to thereby provide sufficiently complete emulations. Thus, a function call 1474 within the analysis routine 1470 is able to call to a portion of a bridge routine instance 1544 that emulates a portion of a library function in the same manner as it otherwise would call to that library function directly within the library routine 1440. In response to having been called in this manner, the bridge routine instance 1544 then passes along the parameters and/or other information received in that call to that library function within a corresponding one of the library routine instances 1444 within a corresponding one of the library processes 1464. Following execution of that library function within that one of the library routine instances 1444, that library function may then provide its results back to the bridge routine instance 1544. In response to having been provided with the results, the bridge routine instance 1544 then passes along the results back to the portion of the analysis routine 1470 from which the function call 1474 was made as if the bridge routine instance 1544 were the library function to which the function call 1474 was originally intended to be made.

Returning to FIG. 12, with the aforedescribed preparations made for the execution of the analysis routine 1470 in conjunction with the library routine 1440 through the instantiation of the multiple library routine instances 1444, the processor 1350 or 1650 may then be caused by the execution component 1512 to begin such execution of the analysis routine 1470. Thus, in some embodiments, and as just discussed in reference to FIGS. 14A-D, execution of the analysis routine 1470 may be entirely forestalled until preparations to make the functionality of the library routine 1440 available to the analysis routine 1470 in a threadsafe manner are completed.

Figure 15:
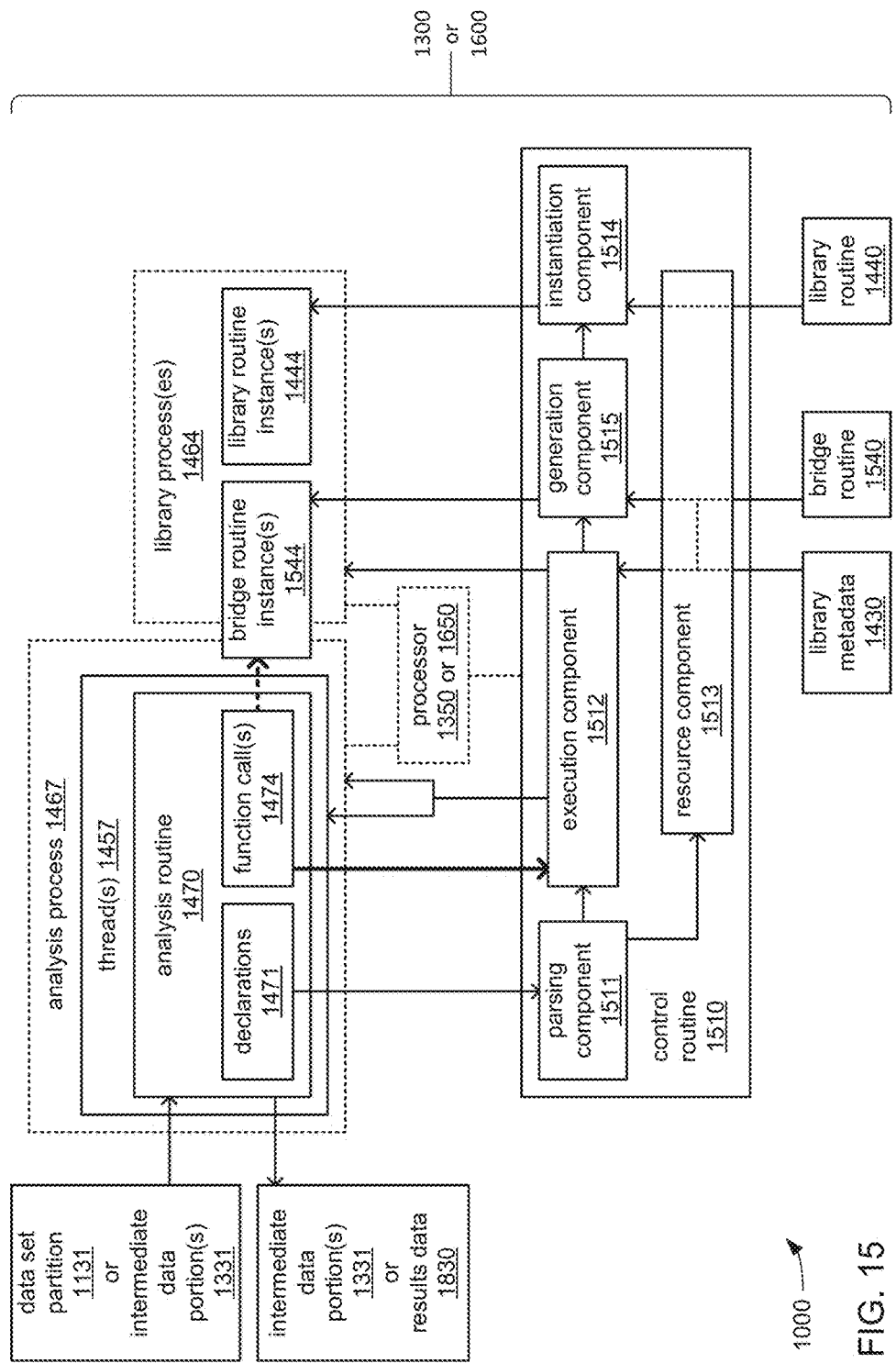
FIG. 15 illustrates an example of dynamic preparation of a non-threadsafe library routine for execution.

FIG. 15, however, depicts aspects of other embodiments in which at least some of such preparations to make the functionality of the library routine 1440 available to the analysis routine 1470 in a threadsafe manner may be made more dynamically, as needed in response to the occurrences of the function calls 1474 during execution of the analysis routine 1470. Such dynamic making of preparations may be deemed desirable in situations where there may be one or more portions of the analysis routine 1470 that include function calls 1474 to the library routine 1440 that may or may not be executed based on one or more conditions. Thus, it may be deemed desirable to not consume processing and/or storage resources within the coordinating device 1600 or within each of the node devices 1300 to make such preparations where there is such uncertainty as to whether at least a significant proportion of the function calls 1474 that may be made depending upon a condition that may change from one instance of executing the analysis routine 1470 to the next.

In such embodiments, the determination of whether the analysis routine 1470 is multi-threaded may still be made prior to commencing execution of the analysis routine 1470. Thus, the processor 1650 of the coordinating device 1600 or the processor 1350 of each of the node devices 1300 may be caused by the parsing component 1511 to parse the source code of at least the analysis routine 1470 (e.g., the declarations 1471, if present) for an indication that the analysis routine 1470 is multi-threaded prior to its execution, as was described in reference to FIGS. 14A-D. In some of such embodiments, it may also be deemed desirable to determine whether the analysis routine 1470 is to make calls to any library routines that are not threadsafe prior to the commencement of execution of the analysis routine 1470. Thus, the processor 1350 or 1650 may be caused by the parsing component 1511 to parse the source code of the analysis routine 1470 for references to any library routines to which calls will be made by the analysis routine 1470. Also, the processor 1350 or 1650 may be caused by the resource component 1513 to search for and retrieve any library metadata that may be associated with any of such library routines, as was described in reference to FIGS. 14A-D, to obtain indications of whether any of those library routines are not threadsafe.

Where the analysis routine 1470 is determined to be multi-threaded, and where one or more library routines to which calls will be made by the analysis routine 1470 are determined to not be threadsafe, such as the non-threadsafe library routine 1440, the processor 1350 or 1650 may be caused by the resource component 1513 to retrieve such library routines, as well as to retrieve the bridge routine 1540) prior to the execution of the analysis routine 1470. This may be deemed desirable as preparation for generating one or more instances of each of the bridge routine 1540 and of such library routines during execution of the analysis routine 1470.

With such determinations made, and with the each of the library metadata 1430, the bridge routine 1540 and the library routine 1440 retrieved, the processor 1350 or 1650 may be caused by the execution component 1512 to commence execution of the analysis routine 1470. During execution of the analysis routine 1470, the processor 1350 or 1650 may be caused by the execution component 1512 to monitor for any occurrence of a function call to a library function of a non-threadsafe library routine, such as the library routine 1440. Where a function call 1474 to the library routine 1440 is made, the processor 1350 or 1650 may be caused by the execution component 1512 to first determine whether the function call 1474 is made from a portion of the analysis routine 1470 that is executed on a thread 1457 for which a corresponding library process 1464 has already been instantiated, and for which both a corresponding library routine instance 1444 and a corresponding bridge routine instance 1544 have been generated (as described in reference to FIGS. 14A-D). If not, then the processor 1350 or 1650 may be caused by the execution component 1512 to instantiate such a corresponding library process 1464, and may be caused by the instantiation component 1514 and the generation component 1515 to generate the corresponding library routine instance 1444 and the corresponding bridge routine instance 1544, respectively.

Figure 16:
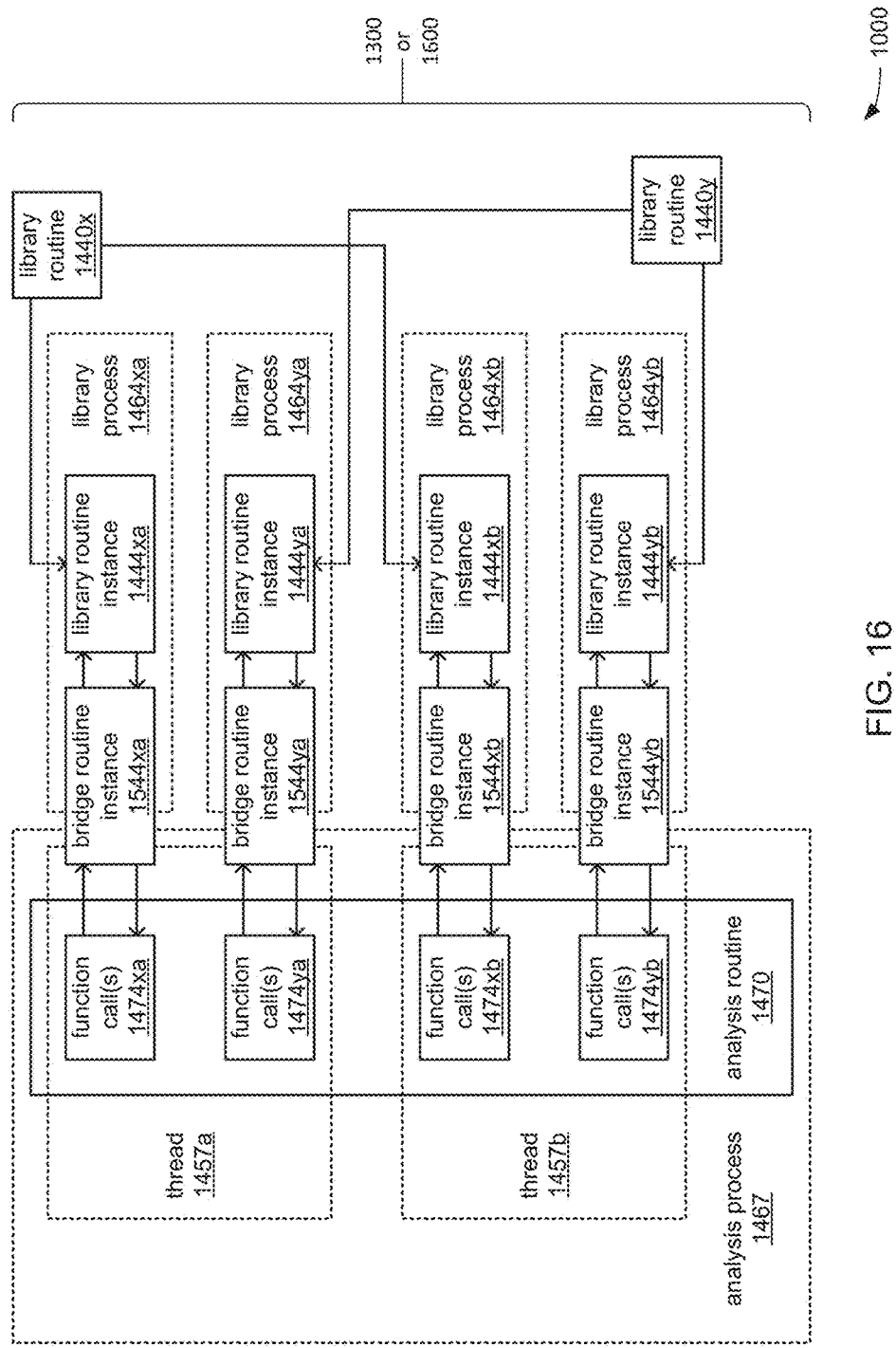
FIG. 16 illustrates an example of supporting the use of multiple non-threadsafe libraries with a multi-threaded analysis routine.

FIG. 16 depicts an example of preparation and execution of multiple non-threadsafe library routines 1440 with the analysis routine 1470, specifically, library routines 1440$x$ and 1440$y$. As depicted, such preparations may entail the instantiation of separate sets of library processes for the instances of each of the library routines 1440$x$ and 1440$y$ that may be generated to address function calls 1474 from each portion of the analysis routine 1470 that may be executed on each thread 1457.

Thus, to enable the library functions of the library routine 1440$x$ to be called by portions of the analysis routine 1470 executed on either of the depicted threads 1457$a$ or 1457$b$, the processor 1350 or 1650 may be caused to instantiate both a library process 1464$xa$ to correspond to the portion of the analysis routine 1470 executed on the thread 1457$a$ and a library process 1464$xb$ to correspond to the portion of the analysis routine 1470 executed on the thread 1457$b$. Also, the processor 1350 or 1650 may be caused to generate both a library routine instance 1444$xa$ and a bridge routine instance 1544$xa$ within the library process 1464$xa$, and both a library routine instance 1444$xb$ and a bridge routine instance 1544$xb$ within the library process 1464$xb$. With these preparations made, a function call 1474$xa$ made to a library function of the library routine 1440$x$ from with the portion of the analysis routine 1470 executed on the thread 1457$a$ would be received by the bridge routine instance 1544$xa$ and relayed to the library routine instance 1444$xa$ within the library process 1464$xa$. Upon completion of execution of that called library function within the library routine instance 1444$xa$, the bridge routine instance 1544$xa$ may relay the results of that execution back to the portion of the analysis routine 1470 executed on the thread 1457$a$ just as the library function would if the library function were directly accessible to that portion of the analysis routine 1470. A similar series of events would occur involving the bridge routine instance 1544$xb$ and the library routine instance 1444$xb$ within the library process 1464$xb$ in response to a function call 1474$xb$ from the portion of the analysis routine 1470 executed on the thread 1457$b$.

To similarly enable the library functions of the library routine 1440$y$ to be called by portions of the analysis routine 1470 executed on either of the depicted threads 1457$a$ or 1457$b$, the processor 1350 or 1650 may be caused to instantiate both a library process 1464$ya$ to correspond to the portion of the analysis routine 1470 executed on the thread 1457$a$ and a library process 1464$yb$ to correspond to the portion of the analysis routine 1470 executed on the thread 1457$b$. Also, the processor 1350 or 1650 may be caused to generate both a library routine instance 1444$ya$ and a bridge routine instance 1544$ya$ within the library process 1464$ya$, and both a library routine instance 1444$yb$ and a bridge routine instance 1544$yb$ within the library process 1464$yb$. With these preparations made, either a function call 1474$ya$ emanating from the portion of the analysis routine 1470 executed on the thread 1457$a$ to a library function of the library routine 1440$y$, of a function call 1474$yb$ emanating from the portion of the analysis routine 1470 executed on the thread 1457b to a library function of the library routine 1440y may be responded to in the manner described just above.

While the example library routines 1440x and 1440y depicted in FIG. 16 may be entirely unrelated library routines that contain entirely different library functions that are called with entirely different identifiers (e.g., different function names) in some embodiments, other embodiments are possible in which one of the example library routines 1440x and 1440y may be a different version of the other (e.g., an older or newer version of the other). In such other embodiments, the two library routines 1440x and 1440y may include library functions with identical identifiers (e.g., identical function names). The use of multiple versions of the same library routine with an analysis routine may occur in situations in which a comparison of the results of a library function as implemented in one of the library routines versus its implementation in another is actually part of the analysis that is performed. However, there may be a risk of collisions in the making of a function call to a library function that exists in more than one of the multiple versions of a library routine and is callable using the same identifier in those multiple versions.

To avoid such collisions where one of the library routines 1440x and 1440y is a different version of the other with a library function implemented in both and callable using the same identifier, the bridge routine instances 1544xa, xb, ya and yb may be generated to effect a change in identifiers. More specifically, while such a library function may be allowed to continue to have the same identifier in its different implementations within each of the library routines 1440x and 1440y, the bridge routine instances 1544xa and 1544xb may be generated to make the library function as implemented in the library routine 1440x callable from the analysis routine 1470 with one alternate identifier (e.g., an identifier created by adding a suffix "A" to the identifier of the library function), and the bridge routine instances 1544ya and 1544yb may be generated to make the library function as implemented in the library routine 1440y callable from the analysis routine 1470 with another alternate identifier (e.g., an identifier created by adding a suffix "B" to the identifier of the library function).

Figure 17B:
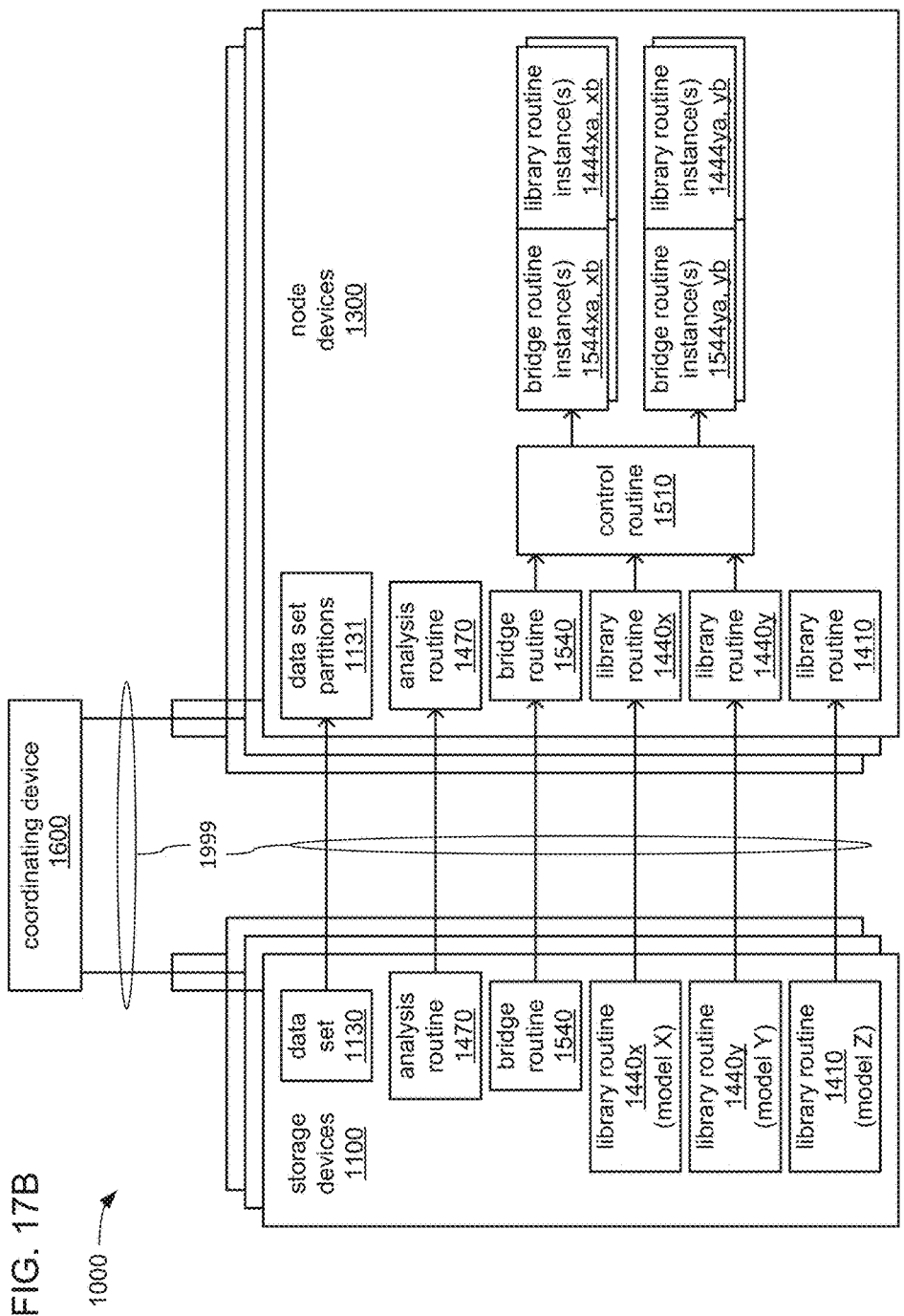
Figure 17C:
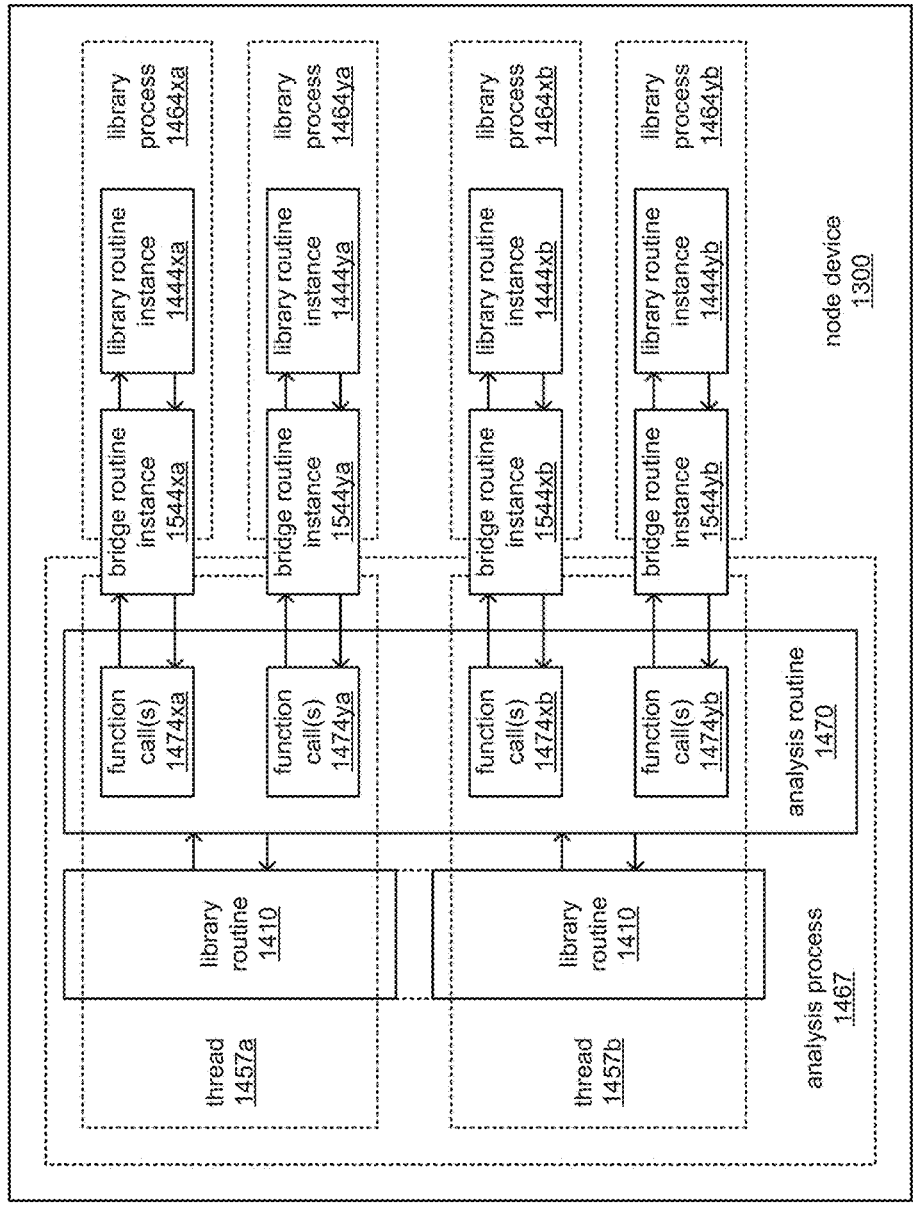

FIGS. 17A-C, together, illustrate an example of preparing for and using multiple non-threadsafe library routines 1440x and 1440y with the analysis routine 1470 in the area of meteorology. FIG. 17A provides both an overhead geographic view and a block diagram of collecting data from and predicting the path of a typical hurricane that originates in the Atlantic Ocean off the West coast of Africa and proceeds in an Westward direction generally towards the Southeastern states of the U.S. Each of FIGS. 17B and 17C illustrates aspects of preparing the non-threadsafe libraries 1440x and 1440y for use by the multiple node devices 1300 to perform, at least partially in parallel, an analysis with a data set 1130 of meteorological data collected from the hurricane to make predictions of the path that the hurricane may take as it comes closer to the U.S.

Turning to FIG. 17A, as a hurricane comes closer to the Atlantic coastline of the U.S., the National Oceanic and Atmospheric Administration (NOAA) and/or the U.S. Air Force Reserve (USAFR) may fly airplanes equipped with numerous meteorological sensors to overfly and/or fly through it, in what are frequently referred to as "hurricane hunter" flights. Such sensors may include Doppler radar carried by the airplanes that is capable of measuring wind speeds, directions, density of precipitation, etc. Such sensors may also include expendable dropsonde devices that are each dropped from the airplanes to fall downward through a portion of a hurricane to record temperature, wind speed, air pressure, etc. at various elevations. Such flights can last several hours, and especially for larger and/or stronger hurricanes, there may be multiple ones of such flights. As a result, a voluminous amount of data may be collected for storage by the storage devices 1100 of the storage device gird 1001.

As the hurricane continues its approach to the U.S., the data collected from the hurricane hunter flights, as well as from other sources (e.g., satellites in orbit overhead, buoys equipped with various sensors, readings from ships that have sailed in or near the hurricane, etc.), may be used to make predictions of upcoming changes in the path of the hurricane, which may provide indications of what portion of the U.S. coastline may be affected by it. Over the course of many years, numerous models have been derived by numerous academic and governmental organizations for the purpose of using such data to make such predictions, including the depicted models X, Y and Z.

Turning to FIG. 17B, in this example, each of the models X, Y and Z may be implemented as callable library functions in library routines 1440x, 1440y and 1410, respectively. In this example, models X and Y may be older models for which the library routines 1440x and 1440y, respectively, may have been created a number of years earlier based on earlier programming practices. As a result, the library routines 1440x and 1440y may not be threadsafe. In contrast model Z may be somewhat newer such that its corresponding library routine 1410 may have been created more recently based on more recent programming practices. As a result, the library routine 1410 may be threadsafe. While it may be technologically possible to rewrite the library routines 1440x and 1440y in threadsafe form, other factors may preclude efforts to do so. Such factors may include governmental and/or academic budget constraints, involvement of intellectual property rights in the models X and/or Y, a lengthy and/or cost-prohibitive certification process for any new implementation of a model, and/or still other factors. Thus, there may be a need to continue to use the library routines 1440x and 1440y to gain the benefit of using the models X and Y, respectively.

Given the quantity and variety of differing pieces of information in the data set 1130 about the hurricane, it may be deemed desirable to make predictions of the hurricane's path by performing analyses based on each of the models X, Y and Z using multiple ones of the node devices 1300 of the node device grid 1003. As depicted, in preparation for doing so, data set partitions 1131 of the data set 1130 may be distributed from the storage devices 1100 and among the multiple node devices 1300 through the network 1999. Additionally, and as also depicted, copies of the analysis routine 1470, the bridge routine 1540, and/or one or more of the library routines 1440x-y and 1410 may be similarly distributed among the multiple node devices 1300 from the storage devices 1100. The coordinating device 1600 may coordinate the performances of such distributions. Thus, each of the multiple node devices 1300 may perform an analysis of a corresponding data set partition 1131 of the data set 1130 based on each of the multiple node devices 1300 executing the analysis routine 1470 in conjunction with each of the library routines 1440x-y and 1410 to make use of all three of models X, Y and Z, respectively.

Additionally, in this example, the processors 1350 of the multiple node devices 1300 may each be capable of supporting multi-threaded execution, and the analysis routine 1470 may have been written as a multi-threaded routine to take advantage of such support to reduce the time required to perform such an analysis with multiple models. As a result, the situation may exist in this example in which multiple portions of the analysis routine 1370 that are concurrently executed on different threads may each make function calls to the library functions within each of the library routines 1440x-y and 1410. As the library routine 1410 was written to be threadsafe, this situation may pose little or no difficulty in using the library routine 1410 with the analysis routine 1470.

However, as previously discussed, errant results and/or unpredictable execution behavior may be among the various difficulties that may arise as a result of each of the non-threadsafe library routines 1440x and 1440y being subjected to function calls from multiple portions of the analysis routine 1470 executed on separate threads. To address such issues, and as previously discussed in reference to FIGS. 14A-D and FIG. 15, each of the library routines 1440x and 1440v may be prepared to overcome their non-threadsafe characteristics, and thereby enable their use with the analysis routine 1470 as the analysis routine 1470 is executed across multiple threads. More specifically, and as depicted in FIG. 17B, library routine instances 1444xa and 1444xb may be generated of the library routine 1440xd, and correspondingly, library routine instances 1444ya and 1444yb may be generated of the library routine 1440y, to enable function calls to be made to the library functions within each of the library routines 1440x and 1440y from two portions of the analysis routine 1470 that are each executed on one of two separate threads 1457a and 1457b depicted in FIG. 17C. Additionally, corresponding bridge routine instances 1544xa, xb, ya and yb may be generated from the bridge routine 1540 to relay function calls and results of performance of library functions between the analysis routine 1470 and each of the library routine instances 1444xa, xb, ya and yb, respectively.

Still further, and turning more specifically to FIG. 17C, separate library processes 1464xa, xb, ya and yb may be instantiated for the execution within each of the library routine instances 1444xa, xb, ya and yb, respectively. As previously discussed, the instantiation of separate library processes within which each of the library routine instances 1444xa, xb, ya and yb are to be executed serves to isolate each of these library routine instances from each other, thereby overcoming their non-threadsafe characteristics by not permitting these library routine instances to share storage space for the variables, etc.

In contrast, the threadsafe characteristic of the library routine 1410 may obviate the need for such preparations for its use with the analysis routine 1470. More specifically, and as depicted in FIG. 17C, it may be possible for either a single one or multiple ones of the library routine 1410 to be executed at least within the same multi-threaded analysis process 1467 as the analysis routine 1470, if not also on one or both of the same threads 1457a-b as portions of the analysis routine 1470.

Figure 18A:
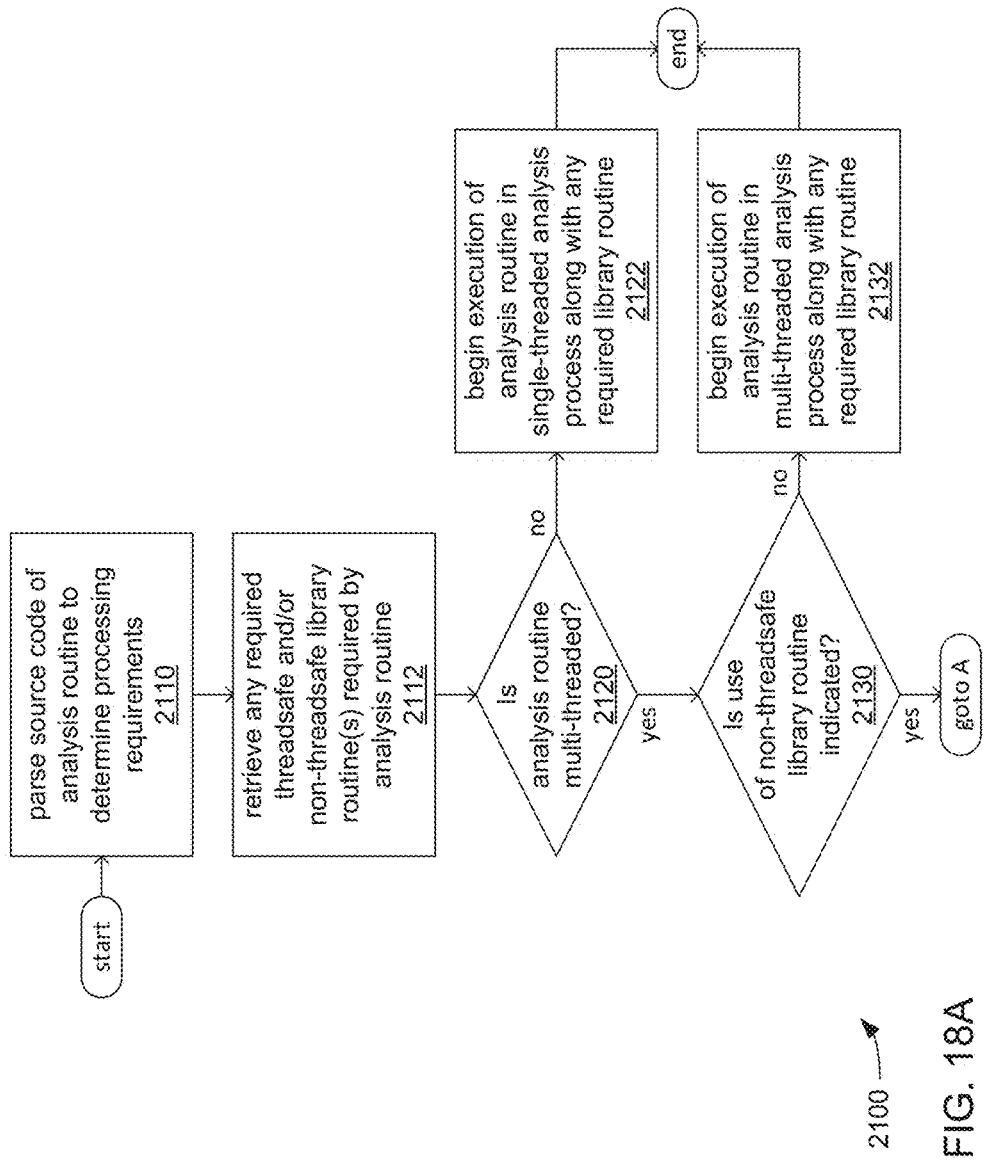
FIGS. 18A and 18B, together, illustrate an example embodiment of a logic flow of preparing a non-threadsafe library routine for execution.
Figure 18B:
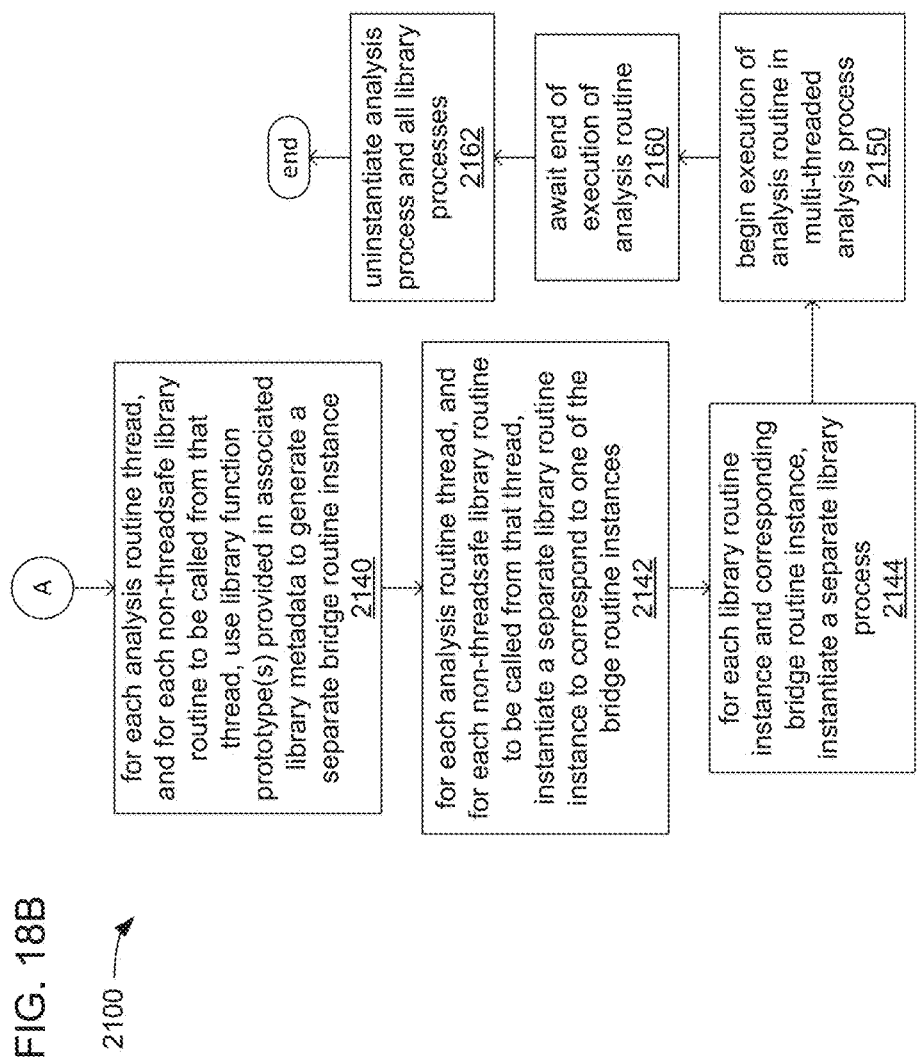

FIGS. 18A and 18B, together, illustrate an example embodiment of a logic flow 2100. The logic flow 2100 may be representative of some or all of the operations executed by one or more embodiments described herein. More specifically, the logic flow 2100 may illustrate operations performed by the processor 1350 or 1650, and/or performed by other component(s) of each of the multiple node devices 1300 or of the coordinating device 1600X), respectfully, in executing the control routine 1510 to prepare an analysis routine for execution in conjunction with at least one non-threadsafe library routine prior to commencement of execution of the analysis routine.

At 2110, a processor of a coordinating device of a distributed processing system (e.g., the processor 1650 of the coordinating device 1600 of the distributed processing system 1000), or a processor of one of multiple node devices of a node device grid of the distributed processing system (e.g., the processor 1350 of one of the multiple node devices 1300 of the node device grid 1003), may parse the source code of an analysis routine (e.g., the analysis routine 1470) to determine the processing requirements of the analysis routine, including whether the analysis routine is multi-threaded. As has been discussed, such parsing may be of declarations within the source code of the analysis routine (e.g., the declarations 1471) for a compiler director, a reference to a particular header file, or other indication that the source code of the analysis routine was written to at least enable execution of the analysis routine as multiple portions that are each executed on a separate thread (e.g., separate ones of the threads 1457).

At 2112, the processor may retrieve any library routines indicated in the source of the analysis routine to be libraries to which function calls may be made during execution of the analysis routine. Among the retrieved libraries may be threadsafe libraries that are able to properly accommodate calls from different portions of the analysis routine executed on different threads, and/or non-threadsafe libraries (e.g., the non-threadsafe library 1440) that may suffer from collisions arising from shared storage space if subjected to such calls from multiple threads.

At 2120, the processor may make a determination of whether the analysis routine is multi-threaded. If not, then at 2122, the processor may commence execution of the analysis routine as a single-threaded routine within a single-threaded process along with any of the required library routines.

However, if at 2120, the processor determines that the analysis routine is multi-threaded, then at 2130, the processor may make a determination of whether there any of the library routines required for the execution of the analysis routine are not threadsafe. If none are, then at 2132, the processor may commence execution of the analysis routine as a multi-threaded routine within a multi-threaded process along with any of the required library routines.

However, if at 2130, the processor determines that there is at least one non-threadsafe library routine required for the execution of the analysis routine, then at 2140, for each non-threadsafe library routine and for each thread on which a portion of the analysis routine is executed that makes a call to the non-threadsafe library routine, the processor may generate a separate bridge routine instance (e.g., a separate one of the bridge routine instances 1544). In so doing, the processor may employ information concerning the library functions of the library routine that may be provided in library metadata (e.g., the library metadata 1430) that corresponds to the library routine, such as a prototype or other description of the library function(s) that specifies identifiers and/or aspects of parameters that are exchanged, etc. As previously discussed, each such bridge routine instance may be generated to serve as a buffer between the analysis routine and an instance of a non-threadsafe library routine, by receiving function calls from the analysis routine for being relayed to the instance of a library routine, and by relaying the results of performances of the called library routines by the instance of the library routine back to the analysis routine.

At 2142, for each non-threadsafe library routine and for each thread on which a portion of the analysis routine is executed that makes a call to the non-threadsafe library routine, the processor may instantiate a separate library routine instance (e.g., a separate one of the library routine instances 1444) that corresponds to one of the generated bridge routine instances. At 2144, the processor may also instantiate a separate library process that corresponds to each combination of corresponding bridge routine instance and library routine instance. As previously discussed, the execution of each library routine instance within its own separate library process may serve to isolate each of the library routine instances from all of the others such that there is no sharing of storage space for variables and/or other data among multiple library routine instances, thereby precluding access collisions thereamong.

At 2150, the processor may commence execution of the analysis routine as a multi-threaded routine on multiple threads within an analysis process (e.g., on the multiple threads 1457 of the analysis process 1467), and in conjunction with multiple instances of at least one non-threadsafe library routine that are each executed within a separate library process. At 2160, the processor may await the end of execution of the analysis routine, and in response to the cessation of execution of the analysis routine, may uninstantiate the multi-threaded analysis process and each of the single-threaded library processes.

Figure 19A:
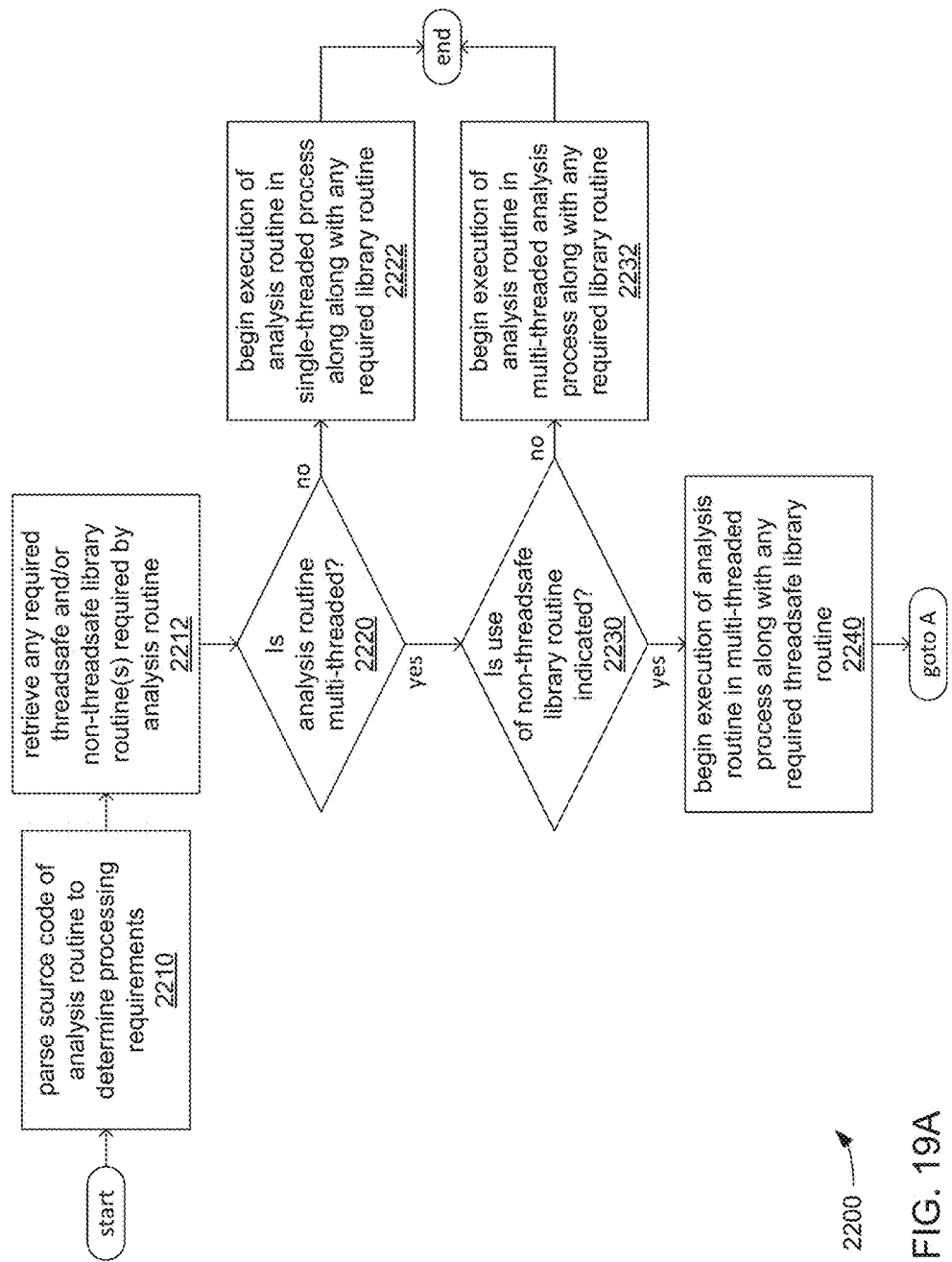
FIGS. 19A and 19B, together, illustrate an example embodiment of a logic flow of dynamically preparing a non-threadsafe library routine for execution.
Figure 19B:
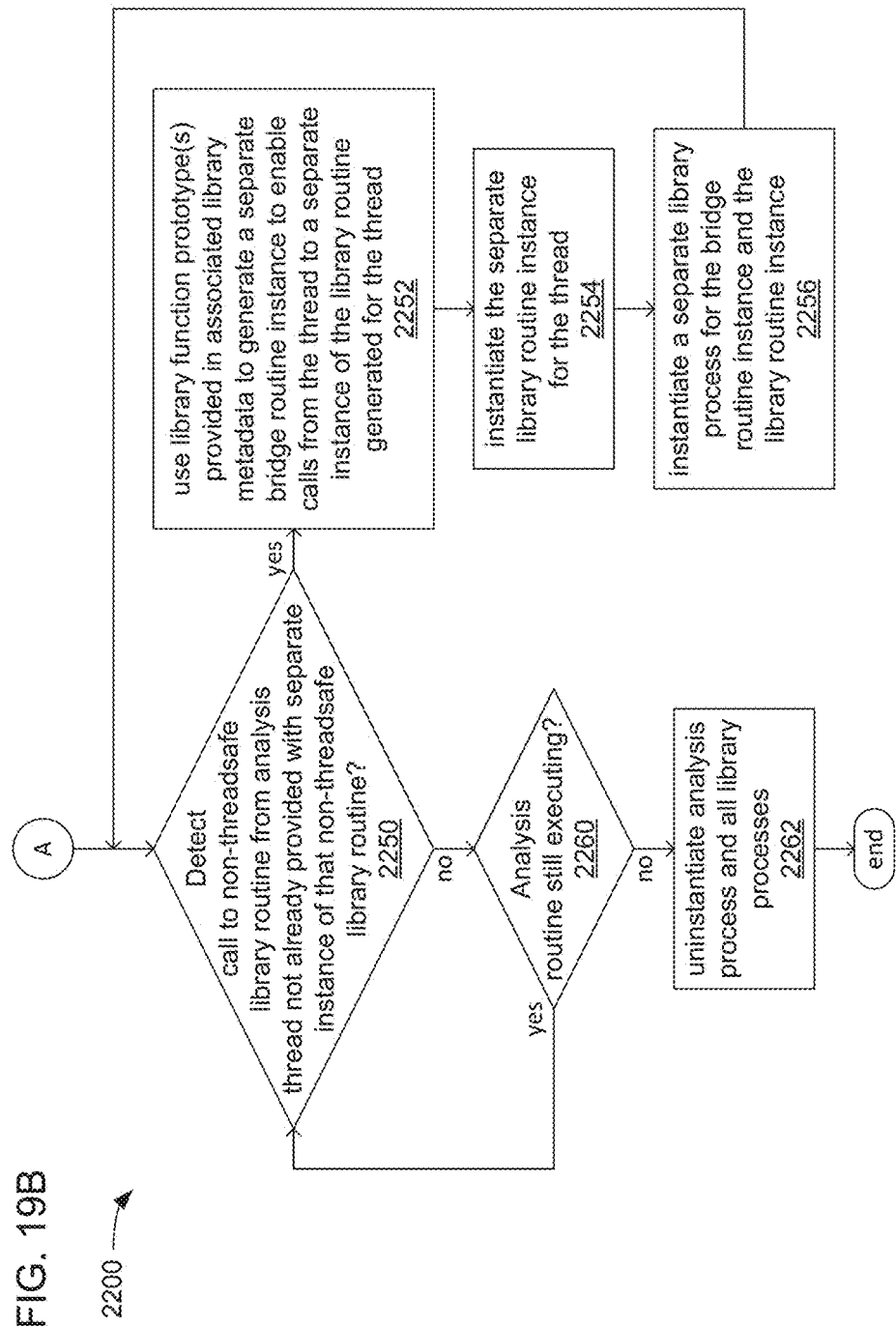

FIGS. 19A and 19B, together, illustrate an example embodiment of a logic flow 2200. The logic flow 2200 may be representative of some or all of the operations executed by one or more embodiments described herein. More specifically, the logic flow 2200 may illustrate operations performed by the processor 1350 or 1650, and/or performed by other component(s) of each of the multiple node devices 1300 or of the coordinating device 1600, respectively, in executing the control routine 1510 to dynamically prepare at least one non-threadsafe library routine for execution in conjunction with an analysis routine during execution of the analysis routine.

At 2210, a processor of a coordinating device of a distributed processing system (e.g., the processor 1650 of the coordinating device 1600 of the distributed processing system 1000), or a processor of one of multiple node devices of a node device grid of the distributed processing system (e.g., the processor 1350 of one of the multiple node devices 1300 of the node device grid 1003), may parse the source code of an analysis routine (e.g., the analysis routine 1470) to determine the processing requirements of the analysis routine, including whether the analysis routine is multi-threaded. At 2212, the processor may retrieve any library routines indicated in the source of the analysis routine to be libraries to which function calls may be made during execution of the analysis routine. Again, among the retrieved libraries may be threadsafe libraries, and/or non-threadsafe libraries (e.g., the non-threadsafe library 1440).

At 2220, the processor may make a determination of whether the analysis routine is multi-threaded. If not, then at 2222, the processor may commence execution of the analysis routine as a single-threaded routine within a single-threaded process along with any of the required library routines.

However, if at 2220, the processor determines that the analysis routine is multi-threaded, then at 2230, the processor may make a determination of whether there are any of the library routines required for the execution of the analysis routine are not threadsafe. If none are, then at 2232, the processor may commence execution of the analysis routine as a multi-threaded routine within a multi-threaded process along with any of the required library routines.

At 2240, the processor may commence execution of the analysis routine as a multi-threaded routine on multiple threads within an analysis process (e.g., on the multiple threads 1457 of the analysis process 1467), along with any threadsafe library routines that may be required to support the execution of the analysis routine. At 2250, the processor may monitor for any instances of a call to a non-threadsafe library routine from a portion of the analysis routine executing on a thread for which a separate instance of the non-threadsafe library routine has not yet been provided. If no such call has been detected at 2250, then at 2260, the processor may check whether the analysis routine is still being executed. If so, then the processor may return to monitoring for such calls at 2250. However, if the analysis routine is not still being executed at 2260, then the processor may uninstantiate the analysis process and any separate library processes that may have been instantiated for instances of the non-threadsafe library routine at 2262.

However, if at 2250, a call is detected to a non-threadsafe library routine from a portion of the analysis routine executing on a thread for which a separate instance of the non-threadsafe routine has not yet been provided, then at 2252, the processor may generate a separate bridge routine instance (e.g., a separate one of the bridge routine instances 1544). In so doing, the processor may employ information concerning the library functions of the library routine that may be provided in library metadata (e.g., the library metadata 1430) that corresponds to the non-threadsafe library routine, such as a prototype or other description of the library function(s) that specifies identifiers and/or aspects of parameters that are exchanged, etc.

At 2254, the processor may instantiate a separate library routine instance (e.g., a separate one of the library routine instances 1444) that corresponds to the bridge routine instance generated at 2252. At 2256, the processor may also instantiate a separate library process that corresponds to the combination of bridge routine instance and library routine instance generated at 2252 and 2254, respectively. With this combination of library routine instance, bridge routine instance and library process so provided, the call detected at 2250 can then be addressed by the processor executing the called library function within the newly generated library routine instance executed within the newly instantiated library process, and then relaying the result of the performance back to the calling portion of the analysis routine through the newly generated bridge routine instance.

In various embodiments, each of the processors 1150, 1350, 1650 and 1850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 1650 of the coordinating device 1600 may be selected to efficiently perform the centralized further analysis of the multiple intermediate data set portions 1331 to generate the results data 1830. Alternatively or additionally, the processor 1350 of each of the node devices 1300 may be selected to efficiently perform an analysis with a data set partition 1131 at least partially in parallel. By way of example, the processor 1350 and/or 1650 may incorporate a single-instruction multiple-data (SIMD) architecture, may incorporate multiple processing pipelines, and/or may incorporate the ability to support multiple simultaneous threads of execution per processing pipeline.

In various embodiments, each of the routines 1110, 1370, 1410, 1440, 1470, 1510, 1670 and 1810, including the components of which each is composed, may be selected to be operative on whatever type of processor or processors that are selected to implement applicable ones of the processors 1150, 1350, 1650 and/or 1850 within corresponding ones of the devices 1100, 1300, 1600 and/or 1800. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1150, 1350, 1650 and/or 1850. Where one or more device drivers are included, those device drivers may provide support for any of a variety of other components, whether hardware or software components, of the devices 1100, 1300, 1600 and/or 1800.

In various embodiments, each of the storages 1160, 1360, 1660 and 1860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1360 of one or more of the node devices 1300 that stores one or more of the data set partitions 1131 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 1620 and 1820 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 1680 and 1880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 1680 of the coordinating device 1600 and/or the display 1880 of the viewing device 1700 may be a touch-screen display such that the input device 1620 may be incorporated into the display 1680 and/or the input device 1820 may be incorporated into the display 1880. In such embodiments, the input device 1620 and/or the input device 1820 may be a touch-sensitive component of the display 1680 and/or the display 1880, respectively.

In various embodiments, the network interfaces 1190, 1390, 1690 and 1890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB® standard, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); the BLUETOOTH® standard; the ZIGBEE® standard; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 1390 of one or more of the node devices 1300 that stores one or more of the data set partitions 1131 may be implemented with multiple copper-based or fiber-optic based network interface ports to provide redundant and/or parallel pathways in exchanging one or more of the data set partitions 1131 with the one or more storage devices 1100.

In various embodiments, the division of processing and/or storage resources among the coordinating device 1600 and/or the node devices 1300, and/or the API architectures supporting communications among the coordinating device 1600 and/or the node devices 1300, may be configured to and/or selected to conform to any of a variety of standards for distributed processing, including without limitation, IEEE P2413, the ALLJOYN® standard, the IOTIVITY™ standard, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of the data set portions 1310 of the selected data set 1113 are not dependent on, nor constrained by, existing API architectures and/or supporting communications protocols. More broadly, there is nothing in the manner in which the selected data set 1113 may be organized in storage, transmission and/or distribution via the network 1999 that is bound to existing API architectures or protocols.

Some systems may use the HADOOP® framework, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node HADOOP® cluster, as understood by a person of skill in the art. the APACHE™ HADOOP® framework is an open-source software framework for distributed computing.

The invention claimed is:

1. An apparatus comprising a processor and a storage to store instructions that, when executed by the processor, cause the processor to perform operations comprising:
   parse declaration code of an analysis routine to determine whether the analysis routine is multi-threaded and is to make at least one function call to at least one non-threadsafe library routine; and
   in response to a determination that the analysis routine is multithreaded and is to make at least one function call to at least one non-threadsafe library routine, cause the processor to perform operations comprising:
      instantiate a single analysis process to support execution of the analysis routine on multiple threads;
      instantiate a first instance of a first non-threadsafe library routine of the at least one non-threadsafe library routine for execution by the processor within a first library process, wherein the first library process is isolated from the analysis process;
      instantiate a second instance of the first non-threadsafe library routine for execution by the processor within a second library process, wherein the second library process is isolated from the analysis process and the first library process;
      retrieve first library metadata providing at least one function prototype of at least one library function of the first non-threadsafe library routine;
      employ the at least one function prototype of the first library metadata to generate a first instance of a first bridge routine to enable a function call from the execution of the analysis routine on a first thread of the multiple threads to the at least one library function of the first instance of the first non-threadsafe library routine;
      employ the at least one function prototype of the first library metadata to generate a second instance of the first bridge routine to enable a function call from the execution of the analysis routine on a second thread of the multiple threads to the at least one library function of the second instance of the first non-threadsafe library routine; and
      begin execution of the analysis routine on the multiple threads within the analysis process.

2. The apparatus of claim 1, wherein the processor is caused to generate the first and second instances of the first bridge routine to enable a return of a value, to the analysis routine, that results from execution of the at least one library function.

3. The apparatus of claim 1, wherein the processor is caused to perform operations comprising:
   instantiate an instance of a second non-threadsafe library routine of the at least one non-threadsafe library routine to execute within a third library process, wherein the third library process is isolated from the analysis process and is isolated from the first and second library processes;
   retrieve second library metadata that provides at least one function prototype of at least one library function of the second non-threadsafe library routine; and
   employ the at least one function prototype of the second library metadata to generate an instance of a second bridge routine to enable a function call from the execution of the analysis routine on the first thread to the at least one library function of the instance of the second non-threadsafe library routine.

4. The apparatus of claim 3, wherein the processor is caused to perform operations comprising:
   retrieve bridge routine code;
   employ the at least one function prototype of the first library metadata to generate the first and second instances of the first bridge routine from the bridge routine code; and
   employ the at least one function prototype of the second library metadata to generate the instance of the second bridge routine from the bridge routine code.

5. The apparatus of claim 3, wherein:
   the first non-threadsafe library routine comprises a first version of a callable library function;
   the second non-threadsafe library routines comprises a second version of the callable library function;
   the first version and the second version of the callable library function are each callable with an identical single function call;
   the analysis routine comprises a first function call that specifies the first version of the callable library function and a second function call that specifies the second version of the callable library function; and
   the processor is caused to perform operations comprising:
      generate the first instance of the first bridge routine to convert the first function call into the single function call directed to the first version of the callable library function within the first non-threadsafe library routine; and
      generate the instance of the second bridge routine to convert the second function call into the single function call directed to the second version of the callable library function within the second non-threadsafe library routine.

6. The apparatus of claim 1, wherein the processor is caused to instantiate the analysis process, instantiate the first and second instances of the first non-threadsafe library routine, and generate the first and second instances of the first bridge routine dynamically at runtime of the analysis routine.

7. The apparatus of claim 6, wherein the processor is caused to perform operations comprising:
monitor execution of the analysis routine at runtime to determine whether there is an occurrence of a function call from execution of the analysis routine on the first thread to the at least one library function of the first non-threadsafe library routine; and
in response to a determination that there is an occurrence of a function call to the at least one library function of the first non-threadsafe library routine, instantiate the first and second instances of the first non-threadsafe library routine, and generate the first and second instances of the first bridge routine.

8. The apparatus of claim 1, wherein the processor begins execution of the analysis routine on the multiple threads within the analysis process after instantiation of the analysis process, after instantiation of the first and second instances of the first non-threadsafe library routine, and after generation of the first and second instances of the first bridge routine.

9. The apparatus of claim 8, wherein the processor is caused to perform operations comprising:
parse the analysis routine to determine whether there is at least one occurrence of a function call to the at least one library function of the first non-threadsafe library routine; and
in response to a determination that there is at least one function call to at least one library function of the first non-threadsafe library routine, instantiate the first and second instances of the first non-threadsafe library routine, and generate the first and second instances of the first bridge routine.

10. The apparatus of claim 1, wherein the processor is caused to perform operations comprising:
monitor execution of the analysis routine to determine whether execution of the analysis routine has ceased; and
in response to a determination that execution of the analysis routine has ceased, uninstantiate the analysis process, and uninstantiate the first and second instances of the first non-threadsafe library routine.

11. A transitory machine-readable storage medium, the machine-readable storage medium storing instructions executable by a processor to cause the processor to perform operations comprising:
parse declaration code of an analysis routine to determine whether the analysis routine is multi-threaded and is to make at least one function call to at least one non-threadsafe library routine; and
in response to a determination that the analysis routine is multithreaded and is to make at least one function call to at least one non-threadsafe library routine, cause the processor to perform operations comprising:
instantiate a single analysis process to support execution of the analysis routine on multiple threads;
instantiate a first instance of a first non-threadsafe library routine of the at least one non-threadsafe library routine for execution by the processor within a first library process, wherein the first library process is isolated from the analysis process;
instantiate a second instance of the first non-threadsafe library routine for execution by the processor within a second library process, wherein the second library process is isolated from the analysis process and the first library process;
retrieve first library metadata providing at least one function prototype of at least one library function of the first non-threadsafe library routine;
employ the at least one function prototype of the first library metadata to generate a first instance of a first bridge routine to enable a function call from the execution of the analysis routine on a first thread of the multiple threads to the at least one library function of the first instance of the first non-threadsafe library routine;
employ the at least one function prototype of the first library metadata to generate a second instance of the first bridge routine to enable a function call from the execution of the analysis routine on a second thread of the multiple threads to the at least one library function of the second instance of the first non-threadsafe library routine; and
begin execution of the analysis routine on the multiple threads within the analysis process.

12. The machine-readable storage medium of claim 11, wherein the processor is caused to generate the first and second instances of the first bridge routine to enable a return of a value, to the analysis routine, that results from execution of the at least one library function.

13. The machine-readable storage medium of claim 11, wherein the processor is caused to perform operations comprising:
instantiate an instance of a second non-threadsafe library routine of the at least one non-threadsafe library routine to execute within a third library process, wherein the third library process is isolated from the analysis process and is isolated from the first and second library processes;
retrieve second library metadata that provides at least one function prototype of at least one library function of the second non-threadsafe library routine; and
employ the at least one function prototype of the second library metadata to generate an instance of a second bridge routine to enable a function call from the execution of the analysis routine on the first thread to the at least one library function of the instance of the second non-threadsafe library routine.

14. The machine-readable storage medium of claim 13, wherein the processor is caused to perform operations comprising:
retrieve bridge routine code;
employ the at least one function prototype of the first library metadata to generate the first and second instances of the first bridge routine from the bridge routine code; and
employ the at least one function prototype of the second library metadata to generate the instance of the second bridge routine from the bridge routine code.

15. The machine-readable storage medium of claim 13, wherein:
the first non-threadsafe library routine comprises a first version of a callable library function;
the second non-threadsafe library routines comprises a second version of the callable library function;
the first version and the second version of the callable library function are each callable with an identical single function call;

the analysis routine comprises a first function call that specifies the first version of the callable library function and a second function call that specifies the second version of the callable library function; and the processor is caused to perform operations comprising:
generate the first instance of the first bridge routine to convert the first function call into the single function call directed to the first version of the callable library function within the first non-threadsafe library routine; and
generate the instance of the second bridge routine to convert the second function call into the single function call directed to the second version of the callable library function within the second non-threadsafe library routine.

16. The machine-readable storage medium of claim 11, wherein the processor is caused to instantiate the analysis process, instantiate the first and second instances of the first non-threadsafe library routine, and generate the first and second instances of the first bridge routine dynamically at runtime of the analysis routine.

17. The machine-readable storage medium of claim 16, wherein the processor is caused to perform operations comprising:
monitor execution of the analysis routine at runtime to determine whether there is an occurrence of a function call from execution of the analysis routine on the first thread to the at least one library function of the first non-threadsafe library routine; and
in response to a determination that there is an occurrence of a function call to the at least one library function of the first non-threadsafe library routine, instantiate the first and second instances of the first non-threadsafe library routine, and generate the first and second instances of the first bridge routine.

18. The machine-readable storage medium of claim 11, wherein the processor begins execution of the analysis routine on the multiple threads within the analysis process after instantiation of the analysis process, after instantiation of the first and second instances of the first non-threadsafe library routine, and after generation of the first and second instances of the first bridge routine.

19. The machine-readable storage medium of claim 18, wherein the processor is caused to perform operations comprising:
parse the analysis routine to determine whether there is at least one occurrence of a function call to the at least one library function of the first non-threadsafe library routine; and
in response to a determination that there is at least one function call to at least one library function of the first non-threadsafe library routine, instantiate the first and second instances of the first non-threadsafe library routine, and generate the first and second instances of the first bridge routine.

20. The machine-readable storage medium of claim 11, wherein the processor is caused to perform operations comprising:
monitor execution of the analysis routine to determine whether execution of the analysis routine has ceased; and
in response to a determination that execution of the analysis routine has ceased, uninstantiate the analysis process, and uninstantiate the first and second instances of the first non-threadsafe library routine.

21. A computer-implemented method comprising:
parsing, by a processor, declaration code of an analysis routine to determine whether the analysis routine is multi-threaded and is to make at least one function call to at least one non-threadsafe library routine; and
in response to a determination by the processor that the analysis routine is multithreaded and is to make at least one function call to at least one non-threadsafe library routine, performing operations comprising:
instantiating a single analysis process to support execution of the analysis routine on multiple threads;
instantiating a first instance of a first non-threadsafe library routine of the at least one non-threadsafe library routine for execution within a first library process, wherein the first library process is isolated from the analysis process;
instantiating a second instance of the first non-threadsafe library routine for execution within a second library process, wherein the second library process is isolated from the analysis process and the first library process;
retrieving, by the processor, first library metadata providing at least one function prototype of at least one library function of the first non-threadsafe library routine;
employing the at least one function prototype of the first library metadata to generate, by the processor, a first instance of a first bridge routine to enable a function call from the execution of the analysis routine on a first thread of the multiple threads to the at least one library function of the first instance of the first non-threadsafe library routine;
employing the at least one function prototype of the first library metadata to generate, by the processor, a second instance of the first bridge routine to enable a function call from the execution of the analysis routine on a second thread of the multiple threads to the at least one library function of the second instance of the first non-threadsafe library routine; and
beginning execution of the analysis routine on the multiple threads within the analysis process.

22. The computer-implemented method of claim 21, comprising generating the first and second instances of the first bridge routine to enable a return of a value, to the analysis routine, that results from executing the at least one library function.

23. The computer-implemented method of claim 21, comprising:
instantiating an instance of a second non-threadsafe library routine of the at least one non-threadsafe library routine for execution within a third library process, wherein the third library process is isolated from the analysis process and is isolated from the first and second library processes;
retrieving, by the processor, second library metadata providing at least one function prototype of at least one library function of the second non-threadsafe library routine; and
employing the at least one function prototype of the second library metadata to generate, by the processor, an instance of a second bridge routine to enable a function call from the execution of the analysis routine on the first thread to the at least one library function of the instance of the second non-threadsafe library routine.

24. The computer-implemented method of claim 23, comprising:
   retrieving bridge routine code;
   employing the at least one function prototype of the first library metadata to generate, by the processor, the first and second instances of the first bridge routine from the bridge routine code; and
   employing the at least one function prototype of the second library metadata to generate, by the processor, the instance of the second bridge routine from the bridge routine code.

25. The computer-implemented method of claim 23, wherein:
   the first non-threadsafe library routine comprises a first version of a callable library function;
   the second non-threadsafe library routines comprises a second version of the callable library function;
   the first version and the second version of the callable library function are each callable with an identical single function call;
   the analysis routine comprises a first function call that specifies the first version of the callable library function and a second function call that specifies the second version of the callable library function; and
   the method comprises:
      generating, by the processor, the first instance of the first bridge routine to convert the first function call into the single function call directed to the first version of the callable library function within the first non-threadsafe library routine; and
      generating, by the processor, the instance of the second bridge routine to convert the second function call into the single function call directed to the second version of the callable library function within the second non-threadsafe library routine.

26. The computer-implemented method of claim 21, comprising instantiating the analysis process, instantiating the first and second instances of the first non-threadsafe library routine, and generating the first and second instances of the first bridge routine dynamically at runtime of the analysis routine.

27. The computer-implemented method of claim 26, comprising:
   monitoring, by the processor, execution of the analysis routine at runtime to determine whether there is an occurrence of a function call from execution of the analysis routine on the first thread to the at least one library function of the first non-threadsafe library routine; and
   in response to a determination that there is an occurrence of a function call to the at least one library function of the first non-threadsafe library routine, instantiating the first and second instances of the first non-threadsafe library routine, and generating the first and second instances of the first bridge routine.

28. The computer-implemented method of claim 21, comprising beginning execution of the analysis routine on the multiple threads within the analysis process after instantiation of the analysis process, after instantiation of the first and second instances of the first non-threadsafe library routine, and after generation of the first and second instances of the first bridge routine.

29. The computer-implemented method of claim 28, comprising:
   parsing, by the processor, the analysis routine to determine whether there is at least one occurrence of a function call to the at least one library function of the first non-threadsafe library routine; and
   in response to a determination that there is at least one function call to at least one library function of the first non-threadsafe library routine, instantiating the first and second instances of the first non-threadsafe library routine, and generating the first and second instances of the first bridge routine.

30. The computer-implemented method of claim 21, comprising:
   monitoring, by the processor, execution of the analysis routine to determine whether execution of the analysis routine has ceased; and
   in response to a determination that execution of the analysis routine has ceased, uninstantiating, by the processor, the analysis process, and uninstantiating, by the processor, the first and second instances of the first non-threadsafe library routine.

* * * * *

UNITED STATES PATENT AND TRADEMARK OFFICE
CERTIFICATE OF CORRECTION

| | | |
|---|---|---|
| PATENT NO. | : 9,785,467 B1 | |
| APPLICATION NO. | : 15/465287 | |
| DATED | : October 10, 2017 | |
| INVENTOR(S) | : Stacey Michelle Christian, Steven Daniel Miles and Steven E. Krueger | |

It is certified that error appears in the above-identified patent and that said Letters Patent is hereby corrected as shown below:

In the Specification

Column 2, Line 44, replace "iwithin" with -- within --.

Column 4, Line 1, replace "ofa" with -- of a --.

Column 47, Line 20, replace "1440v" with -- 1440y --.

Column 47, Line 66, replace "1600X" with -- 1600 --.

In the Claims

Column 55, Line 49, replace "transitory" with -- non-transitory --.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*